(12) United States Patent
Ishihara et al.

(10) Patent No.: US 11,015,078 B2
(45) Date of Patent: May 25, 2021

(54) SURFACE TREATMENT AGENT, SURFACE TREATMENT METHOD, SURFACE TREATMENT BASE MATERIAL, AND SURFACE TREATMENT BASE MATERIAL PRODUCTION METHOD

(71) Applicant: THE UNIVERSITY OF TOKYO, Tokyo (JP)

(72) Inventors: Kazuhiko Ishihara, Tokyo (JP); Yoshihiro Kiritoshi, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 34 days.

(21) Appl. No.: 16/315,473

(22) PCT Filed: Jul. 5, 2017

(86) PCT No.: PCT/JP2017/024574
§ 371 (c)(1),
(2) Date: Jan. 4, 2019

(87) PCT Pub. No.: WO2018/008663
PCT Pub. Date: Jan. 11, 2018

(65) Prior Publication Data
US 2019/0256731 A1   Aug. 22, 2019

(30) Foreign Application Priority Data

Jul. 8, 2016   (JP) .............................. JP2016-136189

(51) Int. Cl.
   C09D 143/02   (2006.01)
   C08F 230/02   (2006.01)
   (Continued)

(52) U.S. Cl.
   CPC ............. *C09D 143/02* (2013.01); *B05D 7/24* (2013.01); *C08F 230/02* (2013.01); *C09D 157/06* (2013.01); *C09K 3/18* (2013.01)

(58) Field of Classification Search
   CPC ...... C09D 143/02; C09D 157/06; B05D 7/24; C08F 230/02; C09K 3/18
   See application file for complete search history.

(56) References Cited

U.S. PATENT DOCUMENTS 5,955,515 A * 9/1999 Kimura ................ B41J 2/04528
                                                     106/31.13
2010/0221658 A1   9/2010 Iwai et al.
(Continued)

FOREIGN PATENT DOCUMENTS

| JP | 2010-231195 A | 10/2010 |
|----|---------------|---------|
| JP | 2011-251431 A | 12/2011 |

(Continued)

OTHER PUBLICATIONS

Fukazawa et al., "Simple surface treatment using amphiphillic phospholipid polymers to obtain wetting and lubricity on polydimethylsiloxane-based substrates," Colloids and Surfaces B: Biointerfaces 97 (2012), pp. 70-76.
(Continued)

*Primary Examiner* — Michael P Wieczorek
(74) *Attorney, Agent, or Firm* — Birch, Stewart, Kolasch & Birch, LLP

(57) ABSTRACT

[Problem] To provide a surface treatment polymer.
[Solution] A compound represented by formula (1), and a surface treatment agent including the compound.
(Continued)

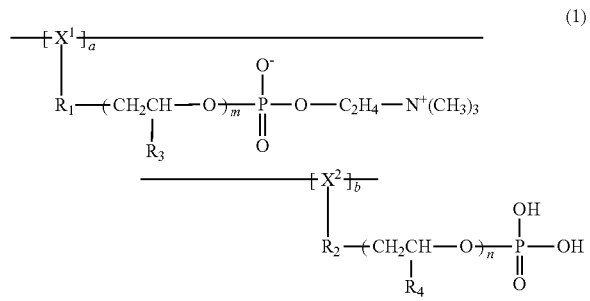

(1)

| | | |
|---|---|---|
| 2014/0267516 | A1* | 9/2014 Nonogaki ............ C09D 11/32 347/100 |
| 2015/0044612 | A1 | 2/2015 Suzuki |

FOREIGN PATENT DOCUMENTS

| JP | 2011-257570 A | 12/2011 |
|---|---|---|
| JP | 2012-91495 A | 5/2012 |
| JP | 2012-181249 A | 9/2012 |
| JP | 2012-187907 A | 10/2012 |
| JP | 2013-57747 A | 3/2013 |
| JP | 2014-114245 A | 6/2014 |
| JP | 2014-177527 A | 9/2014 |
| JP | 5598891 B2 | 10/2014 |
| JP | 2015-54949 A | 3/2015 |
| WO | WO 96/29375 A1 | 9/1996 |
| WO | WO 2013/118736 A1 | 8/2013 |

OTHER PUBLICATIONS

Fukazawa et al., "Synthesis of Photoreactive Phospholipid Polymers for Use in Versatile Surface Modification of Various Materials to Obtain Extreme Wettability," Appl. Mater. Interfaces 2013, 5, pp. 6832-6836.

International Search Report (PCT/ISA/210) issued in PCT/JP2017/024574, dated Aug. 1, 2017.

Silverman et al., "Comparative Properties of Siloxane vs Phosphonate Monolayers on A Key Titanium Alloy," Langmuir 2005, 21, pp. 225-228.

Written Opinion of the International Searching Authority (PCT/ISA/237) issued in PCT/JP2017/024574, dated Aug. 1, 2017.

* cited by examiner

8 Claims, 15 Drawing Sheets

(51) Int. Cl.
  *C09K 3/18* (2006.01)
  *B05D 7/24* (2006.01)
  *C09D 157/06* (2006.01)

(56) References Cited

U.S. PATENT DOCUMENTS

| 2013/0089818 A1 | 4/2013 | Iwai et al. |
|---|---|---|
| 2013/0216950 A1 | 8/2013 | Sato et al. |

[Figure 1]
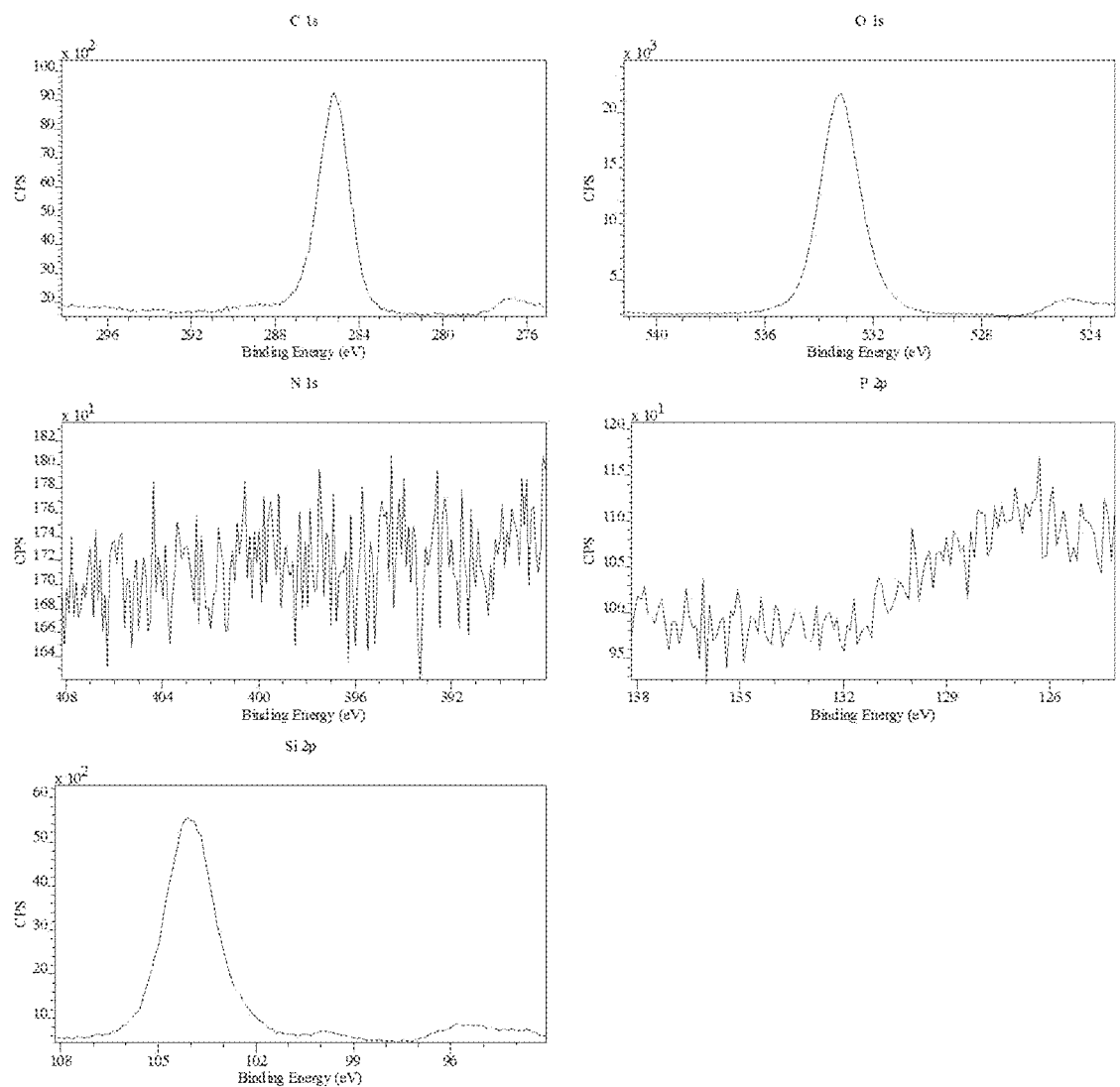

[Figure 2]
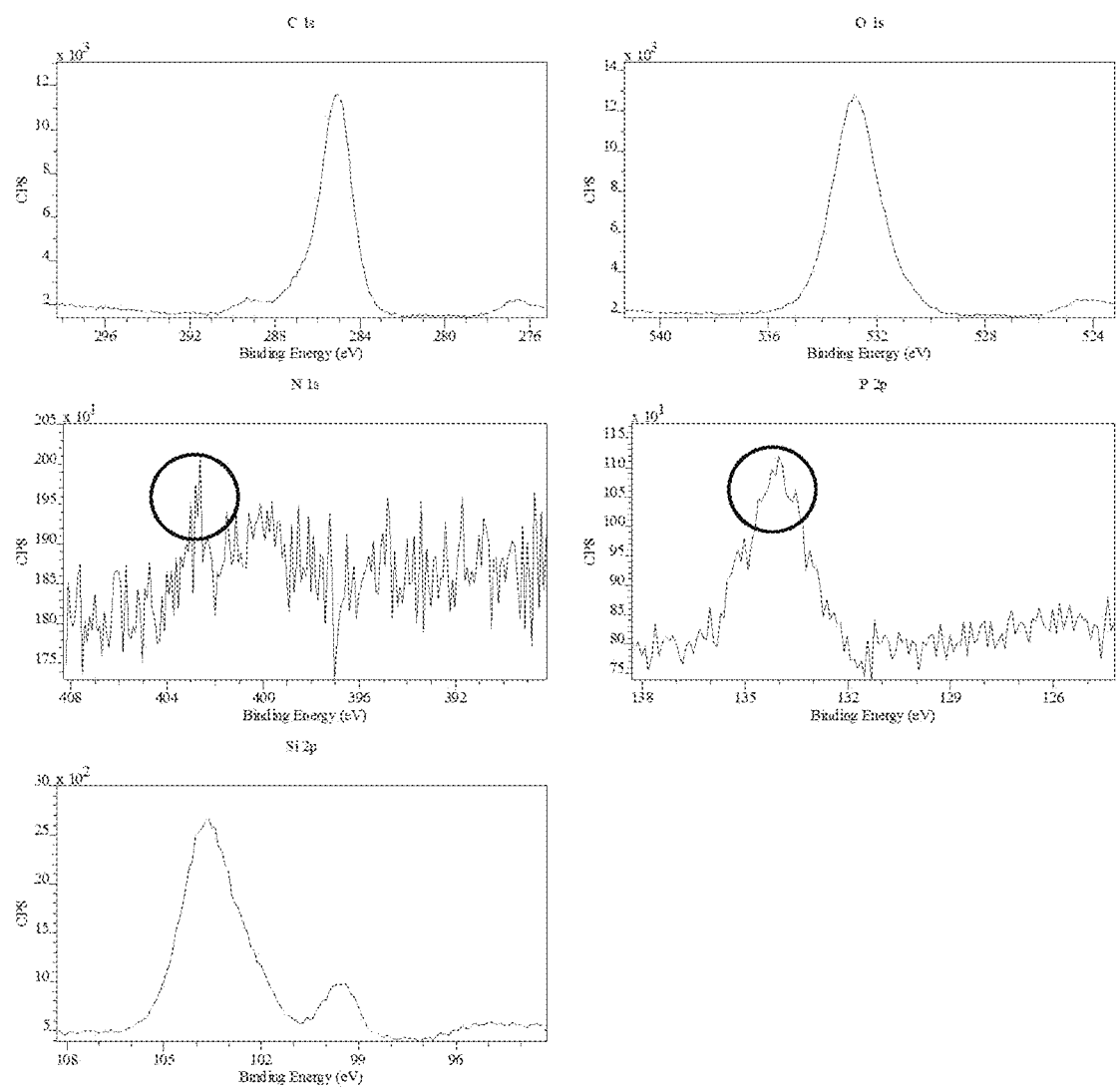

[Figure 3]
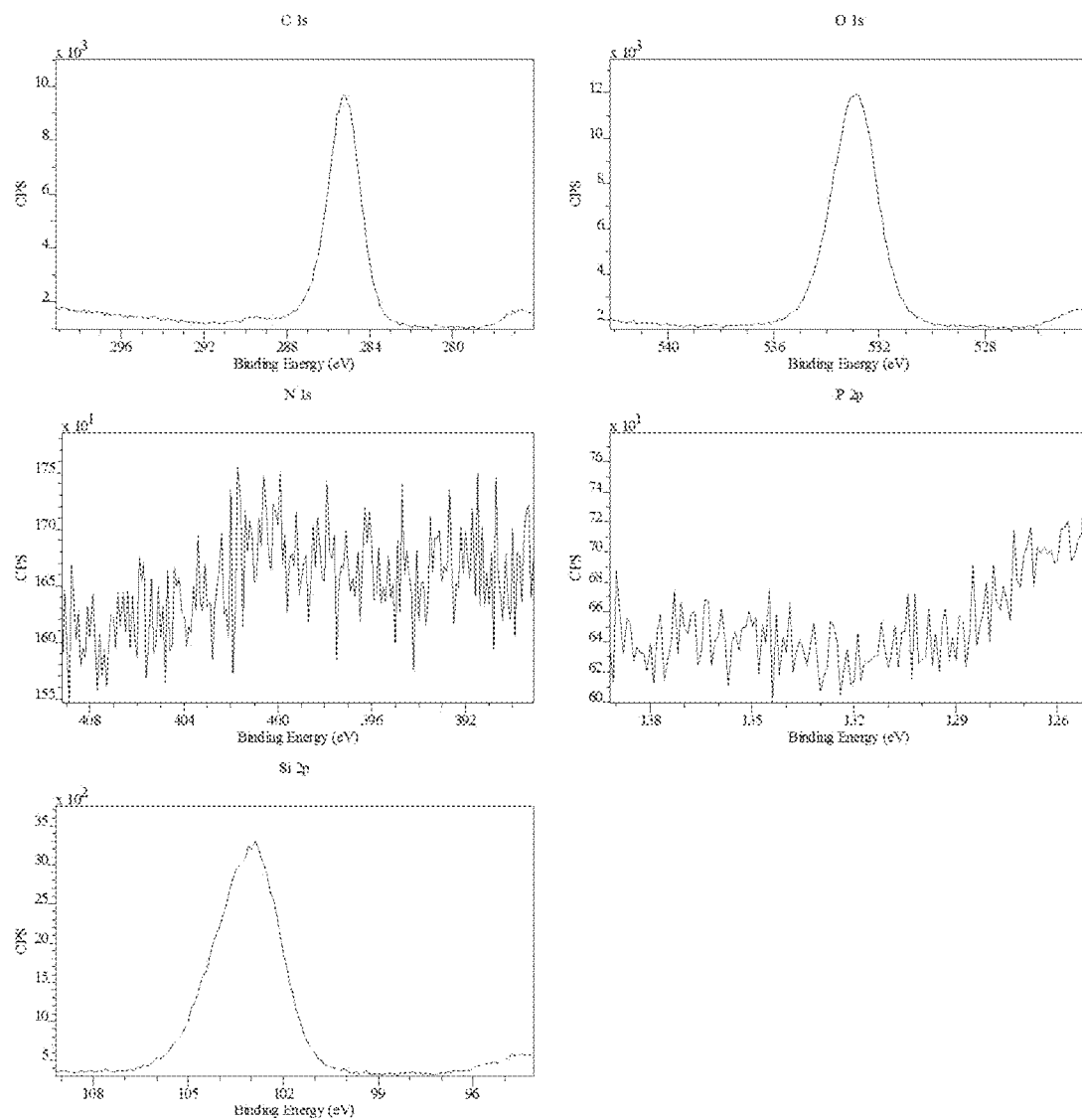

[Figure 4]
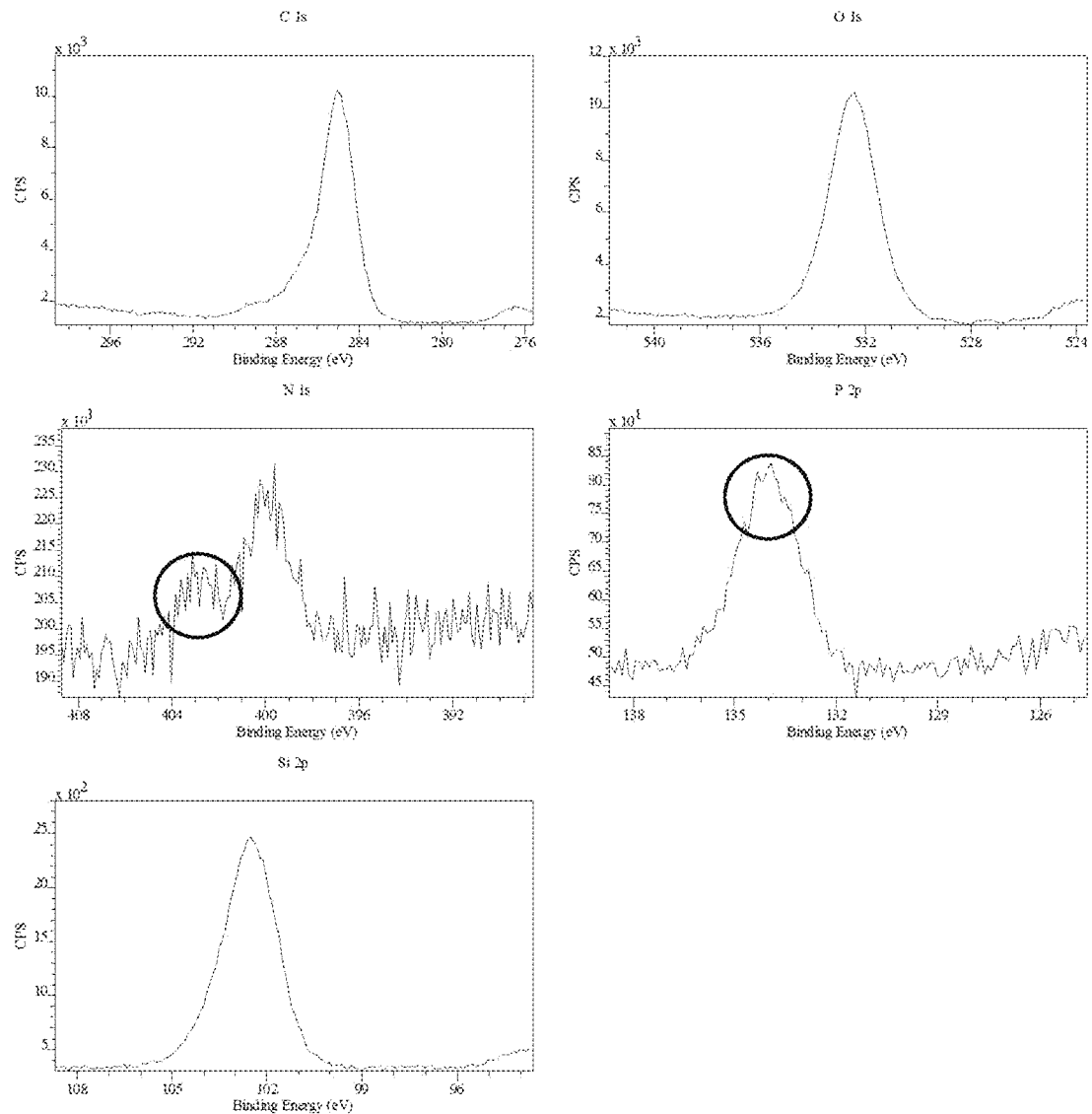

[Figure 5]
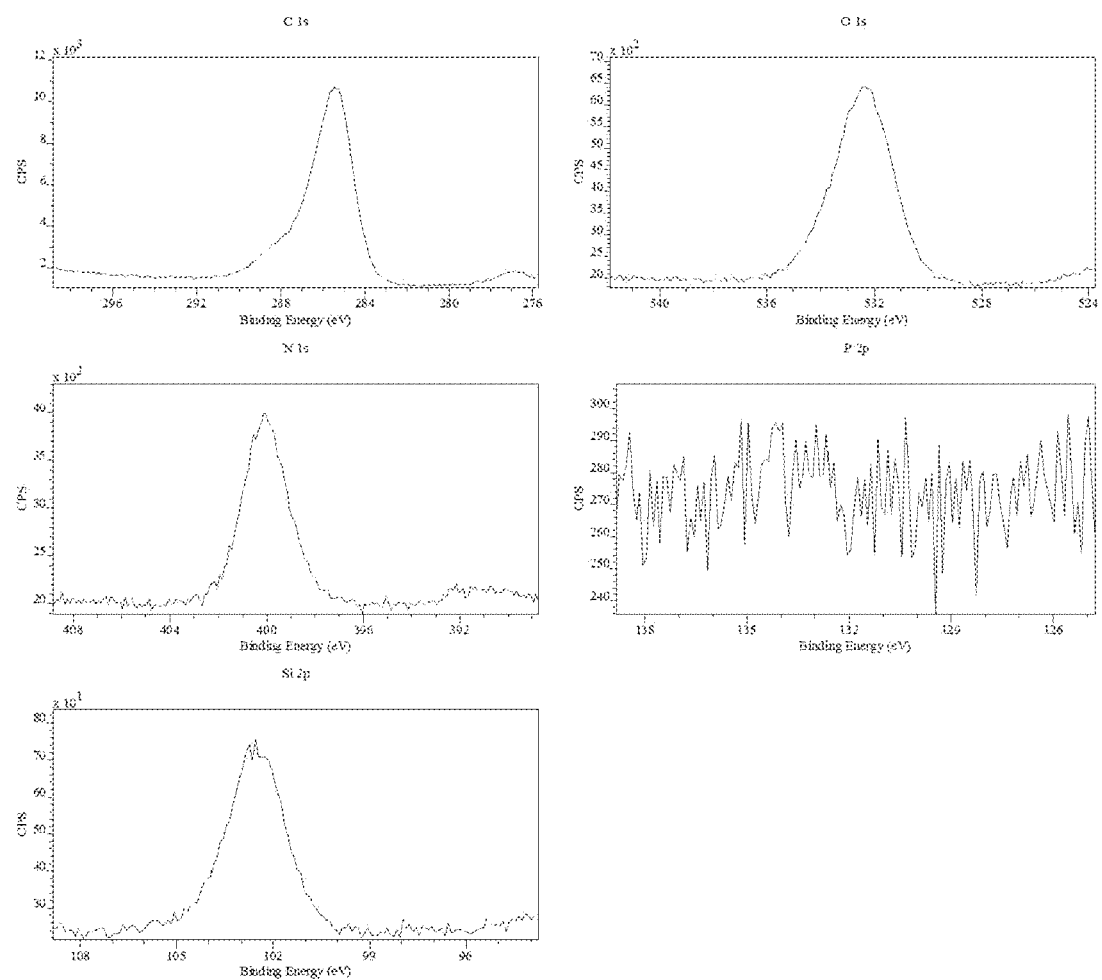

[Figure 6]
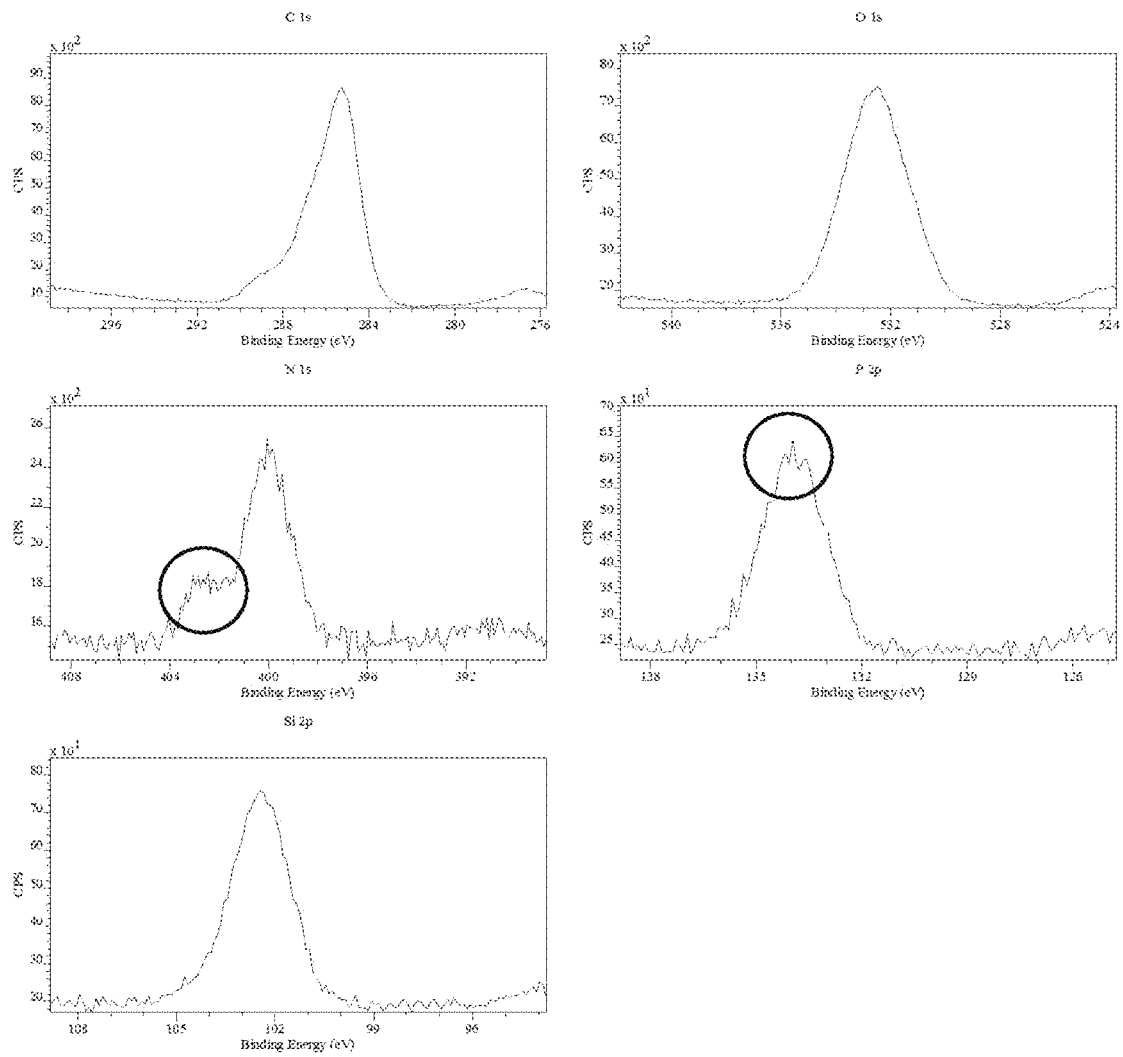
[Figure 7]
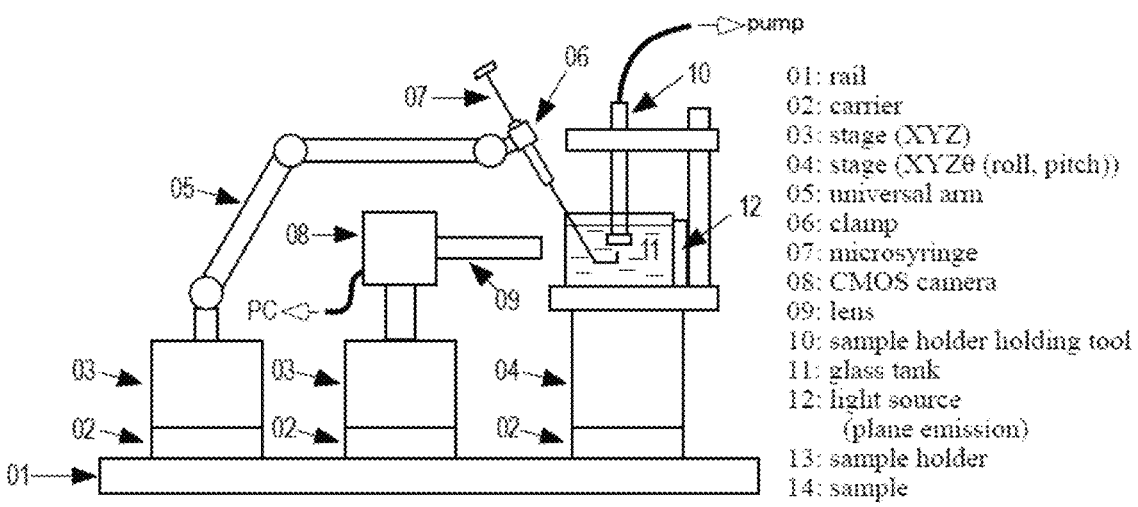

[Figure 8]
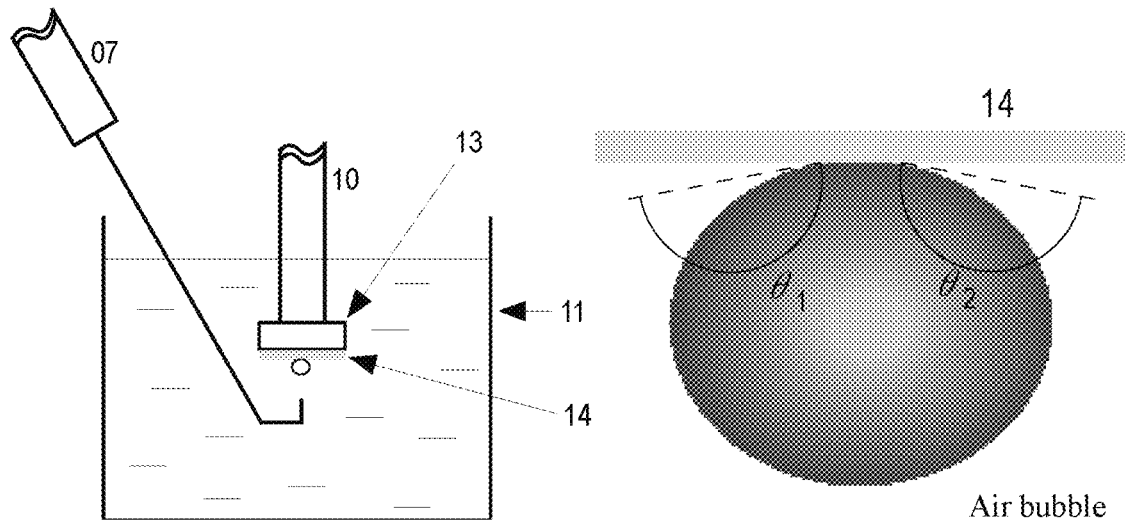
[Figure 9]
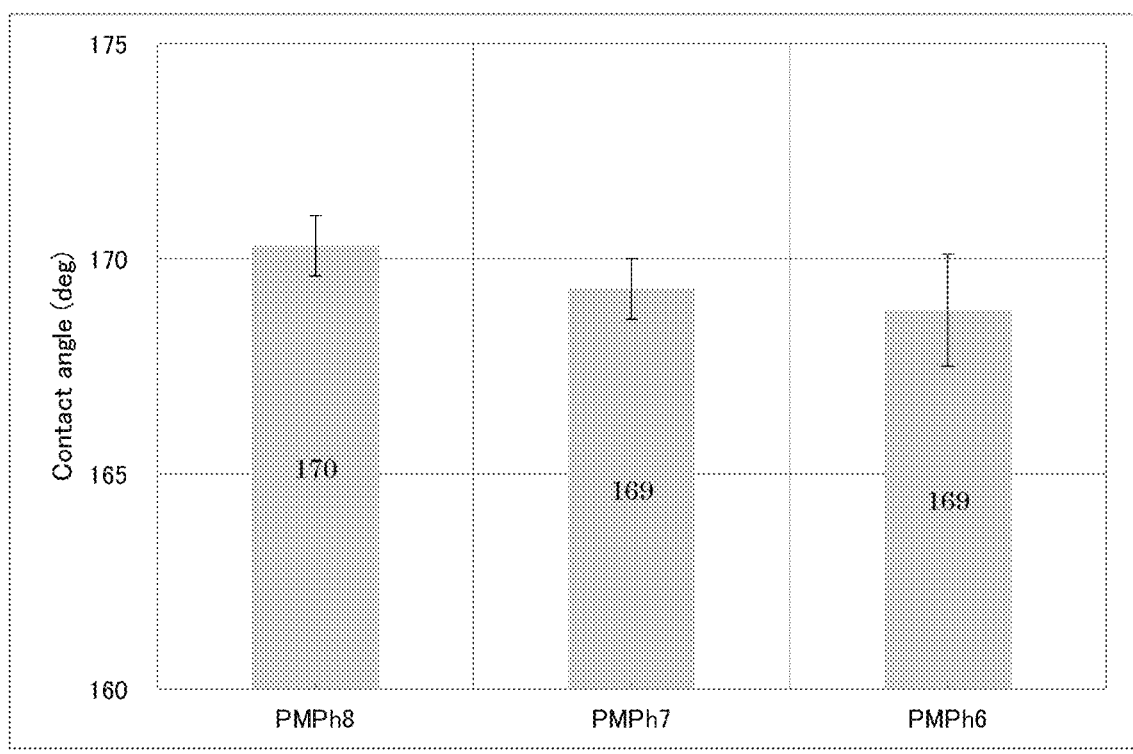

[Figure 10]
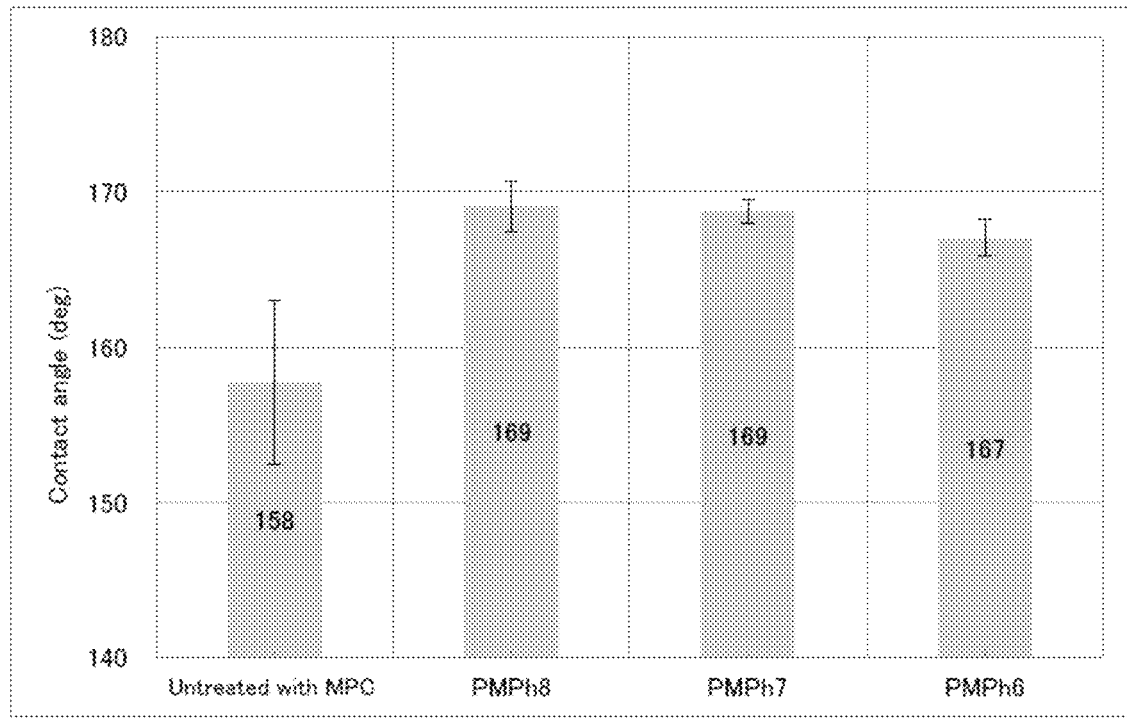
[Figure 11]
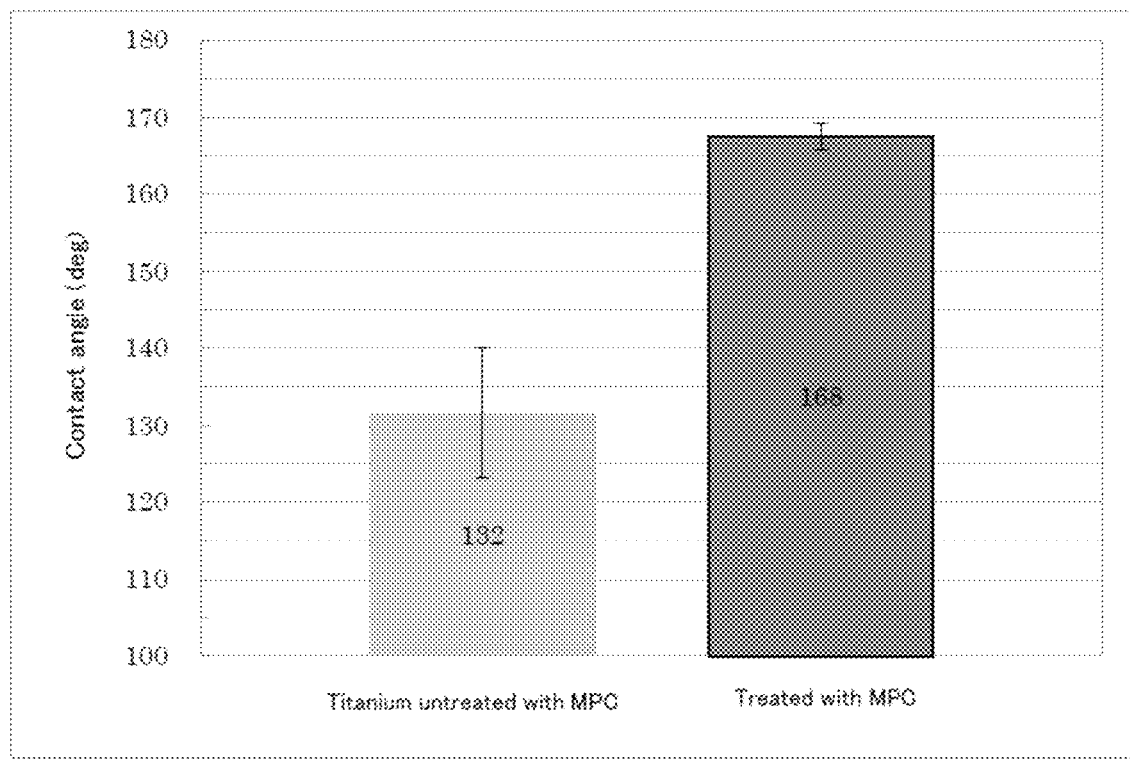

[Figure 12A]
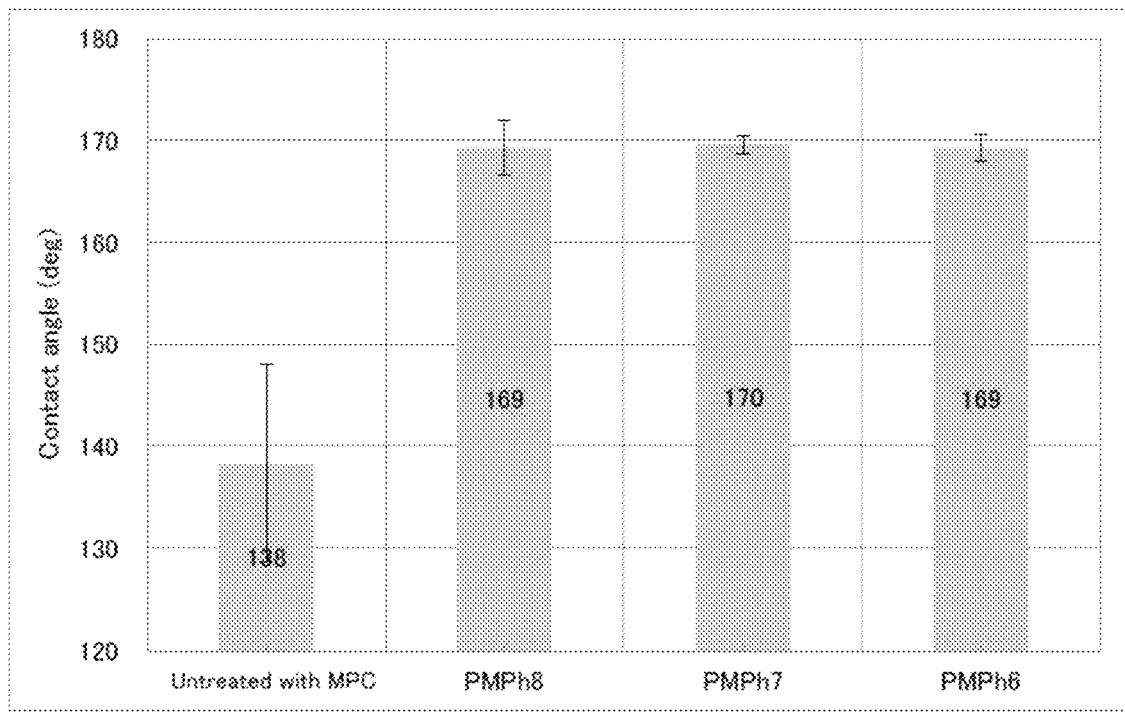
[Figure 12B]
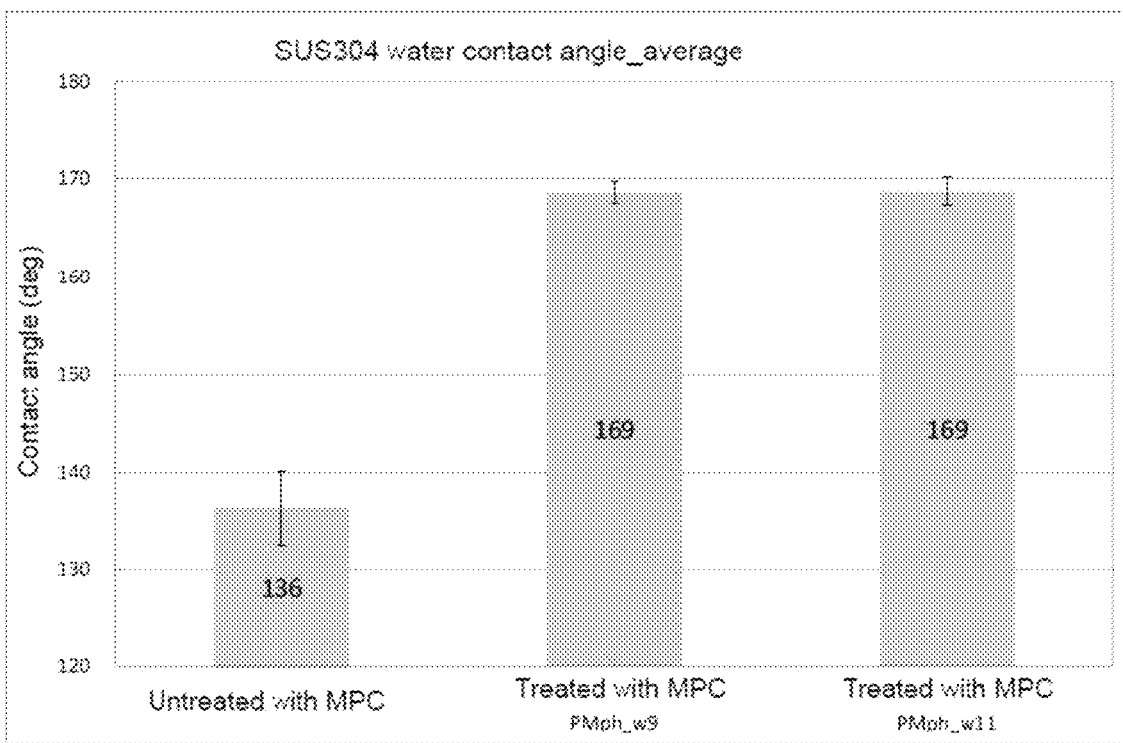

[Figure 12C]
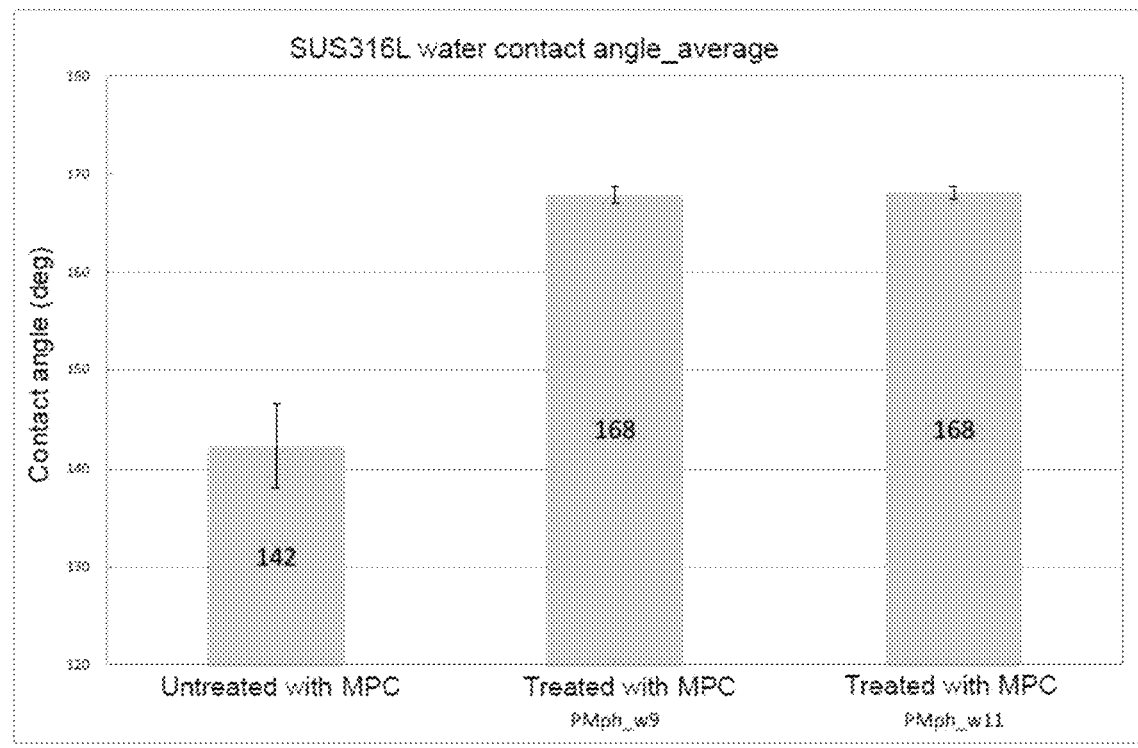
[Figure 13]
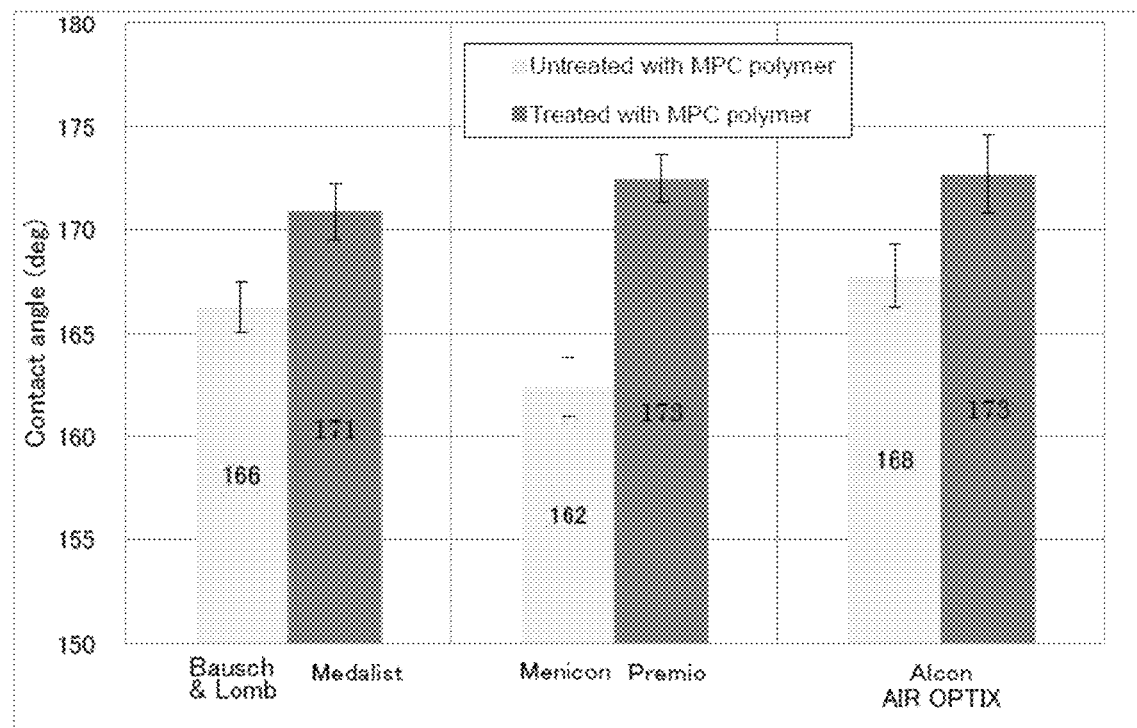

[Figure 14]
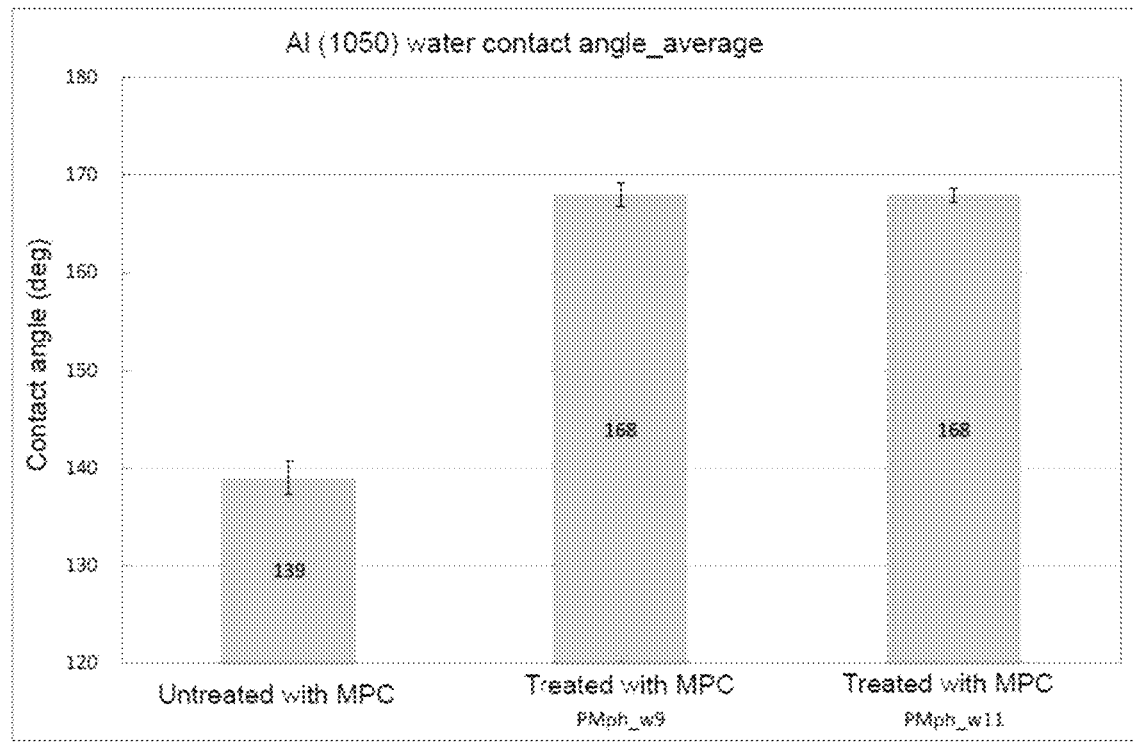
[Figure 15]
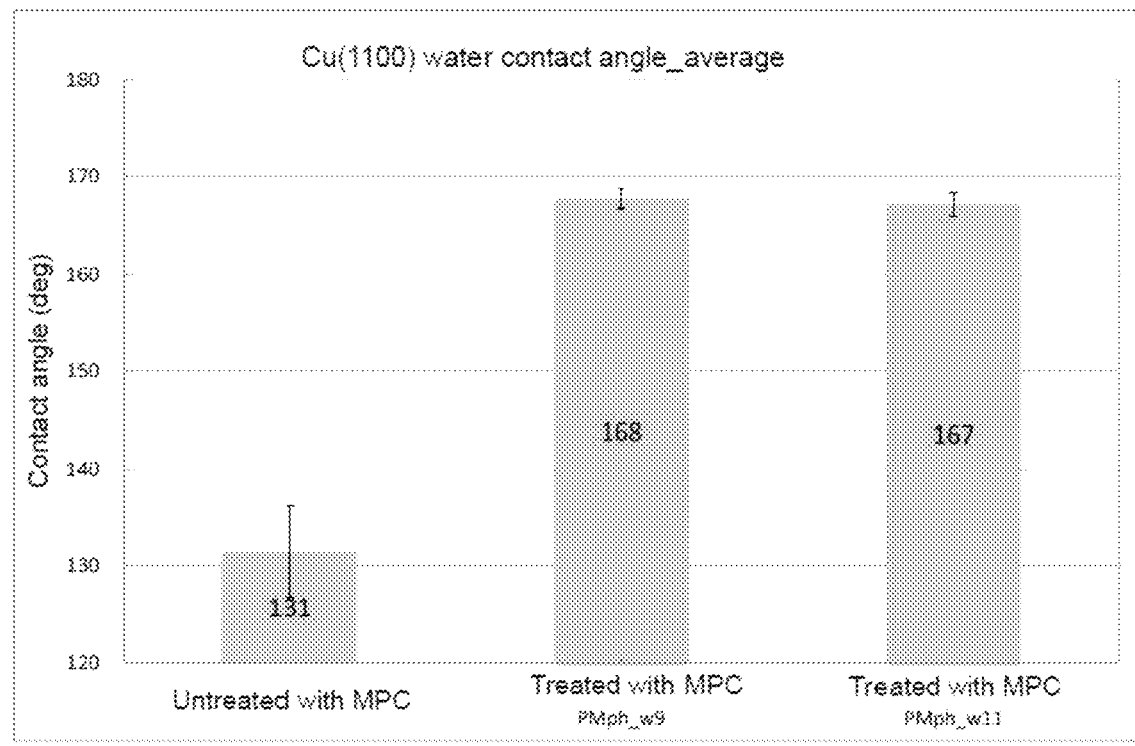

[Figure 16]
| | Glass substrate | |
|---|---|---|
| | Untreated | Coated with MPC polymer |
| Ink application | 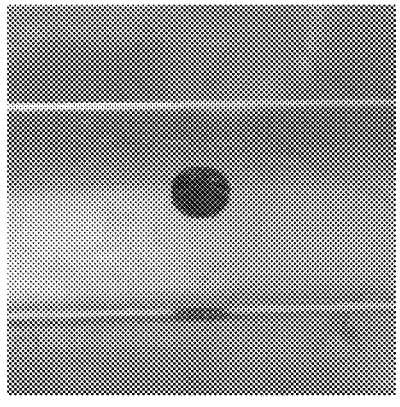 | 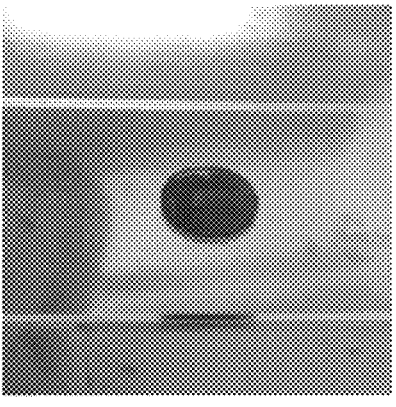 |
| After rinsing with water | 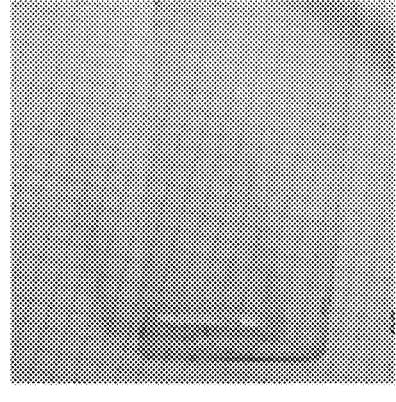 | 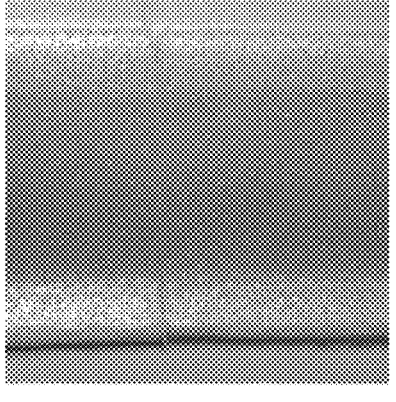 |

[Figure 17]
| | Silicon substrate | |
|---|---|---|
| | Untreated | Coated with MPC polymer |
| Ink application | 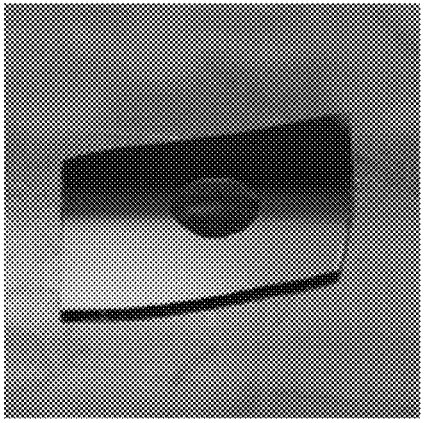 | 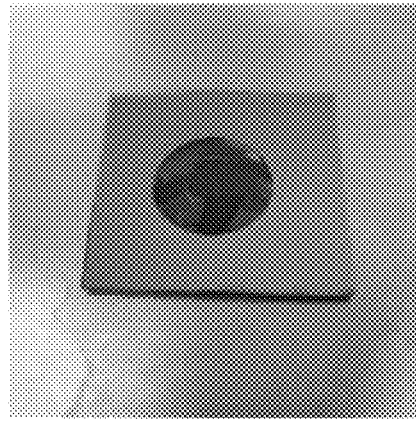 |
| After rinsing with water | 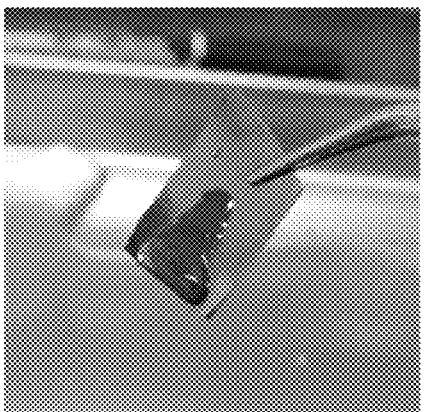 | 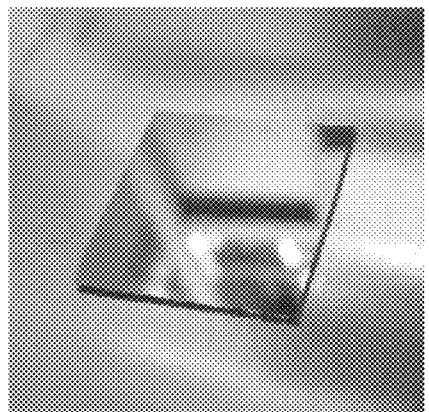 |

[Figure 18]
| | Titanium substrate | |
|---|---|---|
| | Untreated | Coated with MPC polymer |
| Ink application | 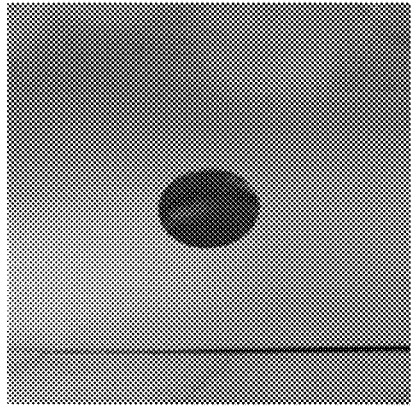 | 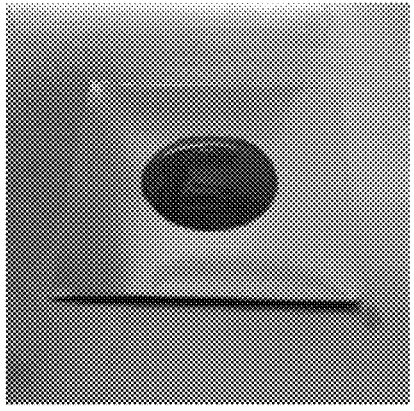 |
| After rinsing with water | 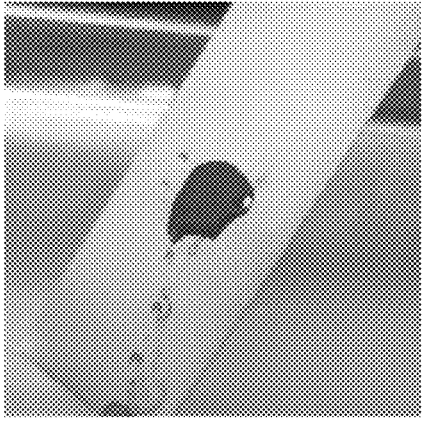 | 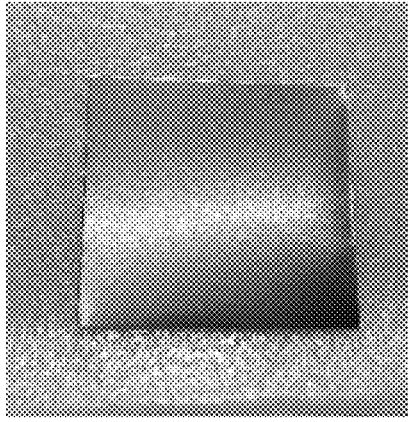 |

[Figure 19]
| | Stainless steel substrate | |
|---|---|---|
| | Untreated | Coated with MPC polymer |
| Ink application | 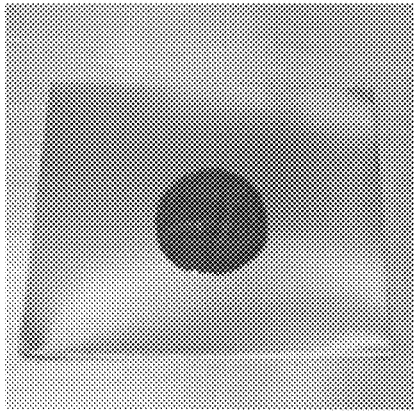 | 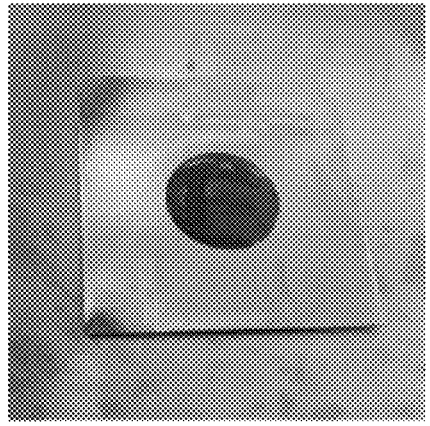 |
| After rinsing with water | 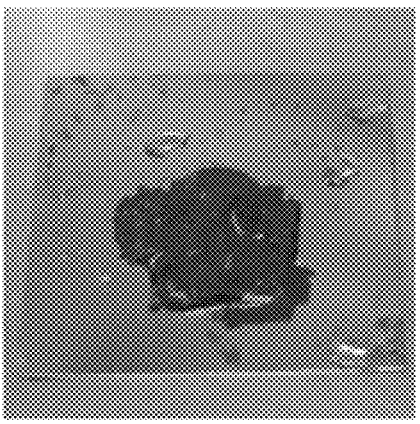 | 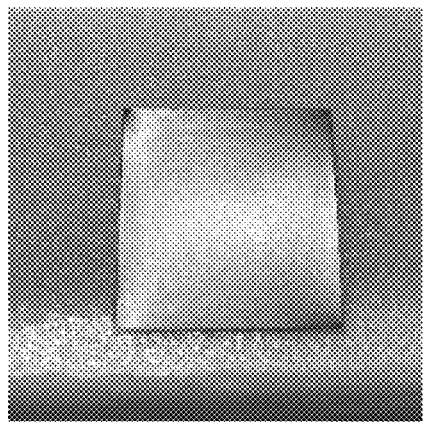 |

SURFACE TREATMENT AGENT, SURFACE TREATMENT METHOD, SURFACE TREATMENT BASE MATERIAL, AND SURFACE TREATMENT BASE MATERIAL PRODUCTION METHOD

TECHNICAL FIELD

The present invention relates to a polymer for surface treatment. Specifically, the present invention relates to a surface treatment polymer, which can be immobilized to a substrate surface for the purpose of improving antifouling property, lubricity, antifog property and self-cleaning function, and which keeps a stable coating state, a surface treatment agent, and a method for modifying a substrate surface.

BACKGROUND ART

Various techniques for preventing adhesion of dirt to the substrate surface have been proposed. For example, when using a medical apparatus such as a contact lens and a spectacle lens or an optical member such as an orthodontic material, an antireflection film, an optical filter, an optical lens and a mirror, to the surface thereof, dirt of protein and lipid included in fingerprints, sebum, sweat or the like, cosmetics or the like is adhered, resulting in reduction in the function. Moreover, removal of such dirt is complicated. For this reason, it is desired to provide an effective dirt prevention treatment.

As a technique of preventing adhesion of dirt to the substrate surface, for example, a method for hydrophilizing a substrate surface is known. Surfaces of many inorganic materials such as glass and metal widely used as substrates of various members exhibit hydrophobicity or weak hydrophilicity. When the surface of a substrate of such an inorganic material is hydrophilized, dirt adhered to the substrate surface can be easily removed by washing with water, and antifouling property can be exhibited.

As a method for hydrophilizing a surface, a technique of modifying a substrate surface with a photocatalytic material such as titanium oxide to highly hydrophilize the surface depending on photoexcitation of the photocatalyst is conventionally known. It has been reported that by applying this technique to various members including a glass, lens, mirror, exterior material and water section member, excellent antifouling property can be imparted thereto (Patent Document 1). However, in the case of such surface modification with titanium oxide, a binder which immobilizes titanium oxide to the substrate may be decomposed by the photocatalytic function possessed by titanium oxide itself, and there is a problem of durability.

Other than that, as methods for hydrophilizing a surface, for example, there are etching treatment, plasma treatment, etc. According to these methods, the surface is highly hydrophilized, but the effect is exerted temporally, and the hydrophilized state cannot be maintained for a long period of time. Further, since a general hydrophilic material has an ionic group in its structure, dirt of protein or the like is rather adhered more, and the effect of suppressing adhesion of dirt to the surface is not sufficient. Thus, it is difficult to obtain an antifouling member having excellent antifouling property and durability by means of conventional hydrophilization treatment.

As a method for suppressing adhesion of dirt while maintaining hydrophilicity, a method for surface treatment of a substrate utilizing a polymer having a zwitterionic structure is known. For example, a method using a polymer which has a monomer unit having a phosphorylcholine group in its side chain, a monomer unit having a hydrophobic group in its side chain and a monomer unit having an azide group in its side chain (Patent Document 2), a method using a polymer which has a monomer unit having a phosphorylcholine group in its side chain, a monomer unit having a hydrophobic group in its side chain and a monomer unit having tertiary amine in its side chain (Patent Document 3), etc. are known. Moreover, it has been tried to prepare surface treatment polymers for various applications (Non-Patent Documents 1 and 2). However, these surface treatment polymers are used to treat the substrate surface mainly by physical interaction, and it is desired to provide a material which can bind to the substrate more firmly.

It has also been tried to provide a method for chemically immobilizing a surface treatment polymer to a substrate surface. For example, a polymer which has a monomer unit having a phosphorylcholine group in its side chain and a monomer unit having a silane reactive group in its side chain was reported (Patent Document 4). Further, for example, Silverman et al. reported that hydrolysis resistance of a silane compound is low, and that when SAM formed on $TiO_2$ was evaluated, the density is higher (about 4 times) in the case of phosphonic acid when compared to the case of a silane coupling agent (Non-Patent Document 3). These polymers have problems. For example, there is a high possibility that hydrolysis is progressed by a slight amount of moisture present in the system during synthesis to cause a crosslinking reaction, it is difficult to control a reaction, and it is difficult to store such polymers for a long period of time after synthesis.

PRIOR ART DOCUMENTS

Patent Documents

Patent Document 1: International Publication WO1996/029375 pamphlet
Patent Document 2: Japanese Patent No. 5598891
Patent Document 3: International Publication WO2013/118736 pamphlet
Patent Document 4: Japanese Laid-Open Patent Publication No. 2011-257570

Non-Patent Documents

Non-Patent Document 1: K. Fukazawa, K. Ishihara, Synthesis of photoreactive phospholipid polymers for use in versatile surface modification of various materials to obtain extreme wettability, ACS Applied Materials and Interfaces, 5(15), 6832-6683 (2013)
Non-Patent Document 2: K. Fukazawa, K. Ishihara, Simple surface treatment using amphiphilic phospholipid polymers to obtain wetting and lubricity on polydimethylsiloxane-based substrates, Colloids and Surfaces B: Biointerfaces 97(1), 70-75 (2012)
Non-Patent Document 3: B. M. Silverman, K. A. Wieghaus, J. Schwartz, Comparative properties of siloxane vs phosphonate monolayers on a key titanium alloy, Langmuir, 21 (1), 225 (2005)

SUMMARY OF THE INVENTION

Problems to be Solved by the Invention

A polymer material which has hydrophilicity and antifouling property and also has good durability is still desired.

Means for Solving the Problems

The present inventors diligently made researches in order to solve the above-described problems, and successfully obtained a surface treatment polymer which can be immobilized on the substrate surface by introducing a phosphonic acid group into a side chain in a polymer, and thus the present invention was achieved.

Specifically, the present invention is as follows:

[1] A polymer compound represented by formula (1):

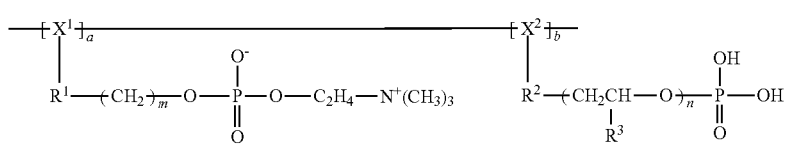
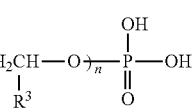

wherein:

$X^1$ and $X^2$ each independently represent a polymerizable atomic group in a polymerized state;

$R^1$ and $R^2$ each independently represent a substituted or unsubstituted phenyl group or a group represented by —C(O)—, —C(O)O— or —O—;

$R^3$ represents a hydrogen atom or a $C_{1-3}$ alkyl group;

m and n each independently represent an integer of 1 or more;

a and b each independently represent an integer of 2 or more; and a structural unit including $X^1$ and a structural unit including $X^2$ are bound in random order.

[2] The compound according to item [1], wherein the compound represented by formula (1) is a polymer having a structure represented by formula (2):

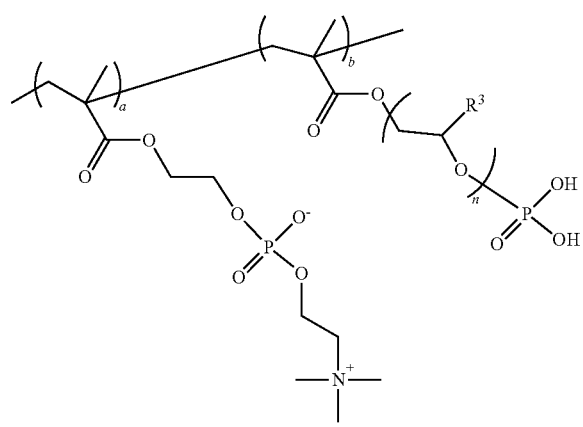

wherein:

$R^3$ represents a hydrogen atom or a $C_{1-3}$ alkyl group;

a and b each independently represent an integer of 2 or more;

n represents an integer of 1 or more; and respective monomer units are bound in random order.

[3] The compound according to item [1] or [2], wherein a/(a+b) is 0.30 to 0.99.

[4] The compound according to any one of items [1] to [3], with which a surface of a substrate can be hydrophilized.

[5] A surface treatment agent comprising the compound according to any one of items [1] to [4].

[6] The treatment agent according to item [5], which is in the form of an aqueous solution.

[7] A surface treatment method for a substrate, which comprises applying the treatment agent according to item [5] or [6] to a surface of the substrate.

[8] A surface-treated substrate, which has: a substrate; and a hydrophilic coating layer containing the compound according to any one of items [1] to [4] on at least one of the surfaces of the substrate.

[9] A method for producing the compound according to any one of items [1] to [4], wherein polymerization is performed using a redox polymerization initiator in an aqueous solvent.

[10] A method for producing a surface-treated substrate having a substrate and a hydrophilic coating layer chemically immobilized on at least one of the surfaces of the substrate, the method comprising:

treating the substrate with at least one selected from the group consisting of plasma treatment, UV/ozone cleaning, corona discharge treatment, flame treatment, ozone water treatment, and hydrogen peroxide solution/Fenton reaction solution treatment; and applying the treatment agent according to item [5] or [6] onto the substrate, followed by drying.

[11] The method according to item [10], which further comprises treating the substrate with a silane coupling agent or a titanate coupling agent.

[12] The method according to item [10] or [11], wherein the substrate is selected from the group consisting of a glass substrate, a silicon substrate, a metal substrate, a metal oxide substrate, a silicone rubber substrate, a silicone hydrogel substrate and a ceramic substrate.

[13] The surface treatment agent according to item [5] or [6], which further comprises at least one of a silane coupling agent and a titanate coupling agent.

[14] A method for producing a surface-treated substrate having a substrate and a hydrophilic coating layer on at least one of the surfaces of the substrate, the method comprising:

treating the substrate with at least one selected from the group consisting of plasma treatment, UV/ozone cleaning, corona discharge treatment, flame treatment, ozone water treatment, and hydrogen peroxide solution/Fenton reaction solution treatment; and applying the treatment agent according to item [13] onto the substrate, followed by drying.

Advantageous Effect Of The Invention

According to the present invention, a polymer for surface treatment, a method for producing the same, a surface treatment method using the same, and a surface-treated substrate are provided. The present invention has at least one of the following effects:
(1) The surface treatment polymer of the present invention can be chemically immobilized on the substrate surface by a dehydration condensation reaction with at least one of a silanol group and a titanol group present on the substrate surface, and can be stably bonded to the substrate surface.
(2) The surface treatment polymer of the present invention can impart at least one of antifouling property, lubricity (low friction), antifog property, and self-cleaning function to the substrate surface.
(3) The surface treatment polymer of the present invention can be synthesized with various compositions by a polymerization reaction using a redox polymerization initiator in an aqueous solvent without occurrence of precipitation and gelation.
(4) The surface treatment polymer of the present invention can be immobilized on various surfaces.

BRIEF DESCRIPTION OF THE DRAWINGS

FIG. 1 shows XPS charts of the untreated silicon substrate.

FIG. 2 shows XPS charts of the silicon substrate coated with a treatment agent of PMPh 6 (aqueous solution of MPC:Phosmer=90:10 (molar ratio)).

FIG. 3 shows XPS charts of the untreated silicone rubber substrate.

FIG. 4 shows XPS charts of the silicone rubber substrate coated with a treatment agent of PMPh 6 (aqueous solution of MPC:Phosmer=90:10 (molar ratio)).

FIG. 5 shows XPS charts of the untreated silicone hydrogel substrate (AIR OPTIX).

FIG. 6 shows XPS charts of silicone hydrogel (AIR OPTIX) coated with a treatment agent of PMPh 6 (aqueous solution of MPC:Phosmer=90:10 (molar ratio)).

FIG. 7 shows an apparatus for measuring a contact angle.

FIG. 8 shows the principle of measurement of a contact angle.

FIG. 9 shows results of the measurement of contact angles of glass substrates coated with a treatment agent of PMPh 6, PMPh 7 or PMPh 8.

FIG. 10 shows results of the measurement of contact angles of an untreated silicon substrate and silicon substrates coated with a treatment agent of PMPh 6, PMPh 7 or PMPh 8.

FIG. 11 shows results of the measurement of contact angles of an untreated titanium substrate and a titanium substrate coated with a treatment agent of PMPh 6.

FIG. 12A shows results of the measurement of contact angles of an untreated stainless steel (SUS304) substrate and stainless steel (SUS304) substrates coated with a treatment agent of PMPh 6, PMPh 7 or PMPh 8 after treated with a silane coupling agent.

FIG. 12B shows results of the measurement of contact angles of an untreated stainless steel (SUS304) substrate and stainless steel (SUS304) substrates coated with a treatment agent of PMPh w9 or PMPh w11 without the treatment with a silane coupling agent.

FIG. 12C shows results of the measurement of contact angles of an untreated stainless steel (SUS316L) substrate and stainless steel (SUS316L) substrates coated with a treatment agent of PMPh w9 or PMPh w11 without the treatment with a silane coupling agent.

FIG. 13 shows results of the measurement of contact angles of untreated silicone hydrogel substrates (Medalist (Bausch & Lomb), AIR OPTIX (Alcon), Premio (Menicon)) and silicone hydrogel substrates (Medalist (Bausch & Lomb), AIR OPTIX (Alcon), Premio (Menicon)) coated with a treatment agent of PMPh 6.

FIG. 14 shows results of the measurement of contact angles of an untreated aluminum (Al1050) substrate and aluminum (Al1050) substrates coated with a treatment agent of PMPh w9 or PMPh w11 without the treatment with a silane coupling agent.

FIG. 15 shows results of the measurement of contact angles of an untreated metal copper (C1100) substrate and metal copper (C1100) substrates coated with a treatment agent of PMPh w9 or PMPh w11 without the treatment with a silane coupling agent.

FIG. 16 shows photographs of an untreated glass substrate and a glass substrate subjected to the coating treatment with PMPh 6, after ink application and subsequently rinsed with water.

FIG. 17 shows photographs of an untreated silicon substrate and a silicon substrate subjected to the coating treatment with PMPh 6 after ink application and subsequently rinsed with water.

FIG. 18 shows photographs of an untreated titanium substrate and a titanium substrate subjected to the coating treatment with PMPh 6 after ink application and subsequently rinsed with water.

FIG. 19 shows photographs of an untreated stainless steel substrate and a stainless steel substrate subjected to the coating treatment with PMPh 6 after ink application and subsequently rinsed with water.

DESCRIPTION OF EMBODIMENTS

Hereinafter, the present invention is described in detail. The scope of the present invention is not limited to the description. In addition to the following examples, the present invention can be suitably changed and then practiced within a range in which the effects of the present invention are not reduced. Note that all the documents and publications cited herein are incorporated herein by reference in their entireties regardless of purposes thereof. In addition, the contents disclosed in the claims, specification and drawings of Japanese Patent Application No. 2016-136189 (filed on Jul. 8, 2016), to which priority is claimed by the present application, are incorporated herein.

1. Polymer Compound

The polymer compound of the present invention is a binary polymer compound having a unit containing a phosphorylcholine group in a side chain thereof and a unit containing a phosphonic acid group in a side chain thereof.

The phosphonic acid group (PA group) contained in the side chain of the polymer compound of the present invention enables immobilization to the substrate surface by means of a chemical bond and can improve stability and durability of surface coating. Specifically, the phosphonic group can be firmly and stably immobilized to the substrate surface by chemical bonding by a dehydration condensation reaction with a functional group that can interact with the phosphonic acid group on the substrate surface (e.g., a silanol group and a titanol group).

The phosphorylcholine group (PC group) contained in the side chain of the polymer compound of the present invention has a zwitterionic structure. For this reason, the polymer, which contains the PC group, has excellent hydrophilicity (wettability) and can effectively suppress nonspecific adsorption of various molecules. This makes it possible to exert antifouling effects, lubricating effects, friction-reducing effects and self-cleaning effects. Further, the phosphorylcholine group (PC group) is a polar group having a structure similar to that of a polar group of phospholipid (phosphatidylcholine) which is the main component of biomembranes. Accordingly, by introduction of the PC group, excellent biocompatibility possessed by the biomembrane surface, in particular, non-adsorption properties for biomolecules and deactivation characteristics can be imparted.

The polymer of the present invention is not limited, and preferred examples thereof include a polymer having a structure represented by formula (1):

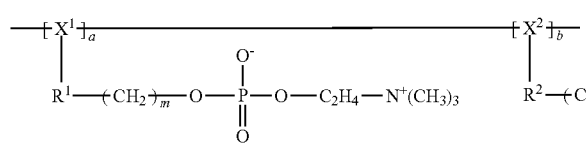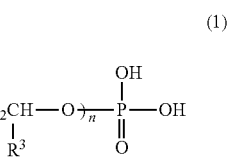

(1)

In formula (1): $X^1$ and $X^2$ each independently represent a polymerizable atomic group in a polymerized state; $R^1$ and $R^2$ each independently represent a substituted or unsubstituted phenyl group or a group represented by —C(O)—, —C(O)O— or —O—; $R^3$ represents a hydrogen atom or a $C_{1-3}$ alkyl group; m and n each independently represent an integer of 1 or more; a and b each independently represent an integer of 2 or more; and a structural unit including $X^1$ and a structural unit including $X^2$ are bound in random order.

In formula (1), $X^1$ and $X^2$ are not limited as long as $X^1$ and $X^2$ each independently represent a polymerizable atomic group in a polymerized state. Specifically, for example, a vinyl-based monomer residue, an acetylene-based monomer residue, an ester-based monomer residue, an amide-based monomer residue, an ether-based monomer residue, a urethane-based monomer residue, etc. are preferred, and among them, a vinyl-based monomer residue is more preferred.

In formula (1), $R^1$ and $R^2$ each independently represent a substituted or unsubstituted phenyl group or a group represented by —C(O)—, —C(O)O— or —O—. They are preferably a group represented by —C(O)—, —C(O)O— or —O—, and more preferably a group represented by —C(O)O—.

Specific examples of substituents of the phenyl group in $R^1$ and $R^2$ include a halogen atom (F, Cl, Br, I), a hydroxyl group, a thiol group, a nitro group, a cyano group, a formyl group, a carboxyl group, an amino group, a silyl group, a methanesulfonyl group, a $C_{1-6}$ alkyl group, a $C_{2-6}$ alkenyl group, a $C_{2-6}$ alkynyl group, a $C_{3-8}$ cycloalkyl group, a $C_{6-10}$ aryl group, a $C_{1-6}$ alkoxy group, a $C_{2-7}$ acyl group and a $C_{2-7}$ alkoxycarbonyl group.

$R^1$ and $R^2$ may be the same or different. From the viewpoint of polymerization reactivity, it is preferred that $R^1$ and $R^2$ are the same, and it is particularly preferred that both are a group represented by —C(O)O—.

In formula (1), $R^3$ represents a hydrogen atom or a $C_{1-3}$ linear or branched alkyl group. From the viewpoint of solubility in a polymerization solvent, $R^3$ is preferably a hydrogen atom or a methyl group, and more preferably a hydrogen atom.

m represents an integer of 1 or more, preferably an integer of 1 to 12, more preferably an integer of 1 to 4, and particularly preferably 2.

n represents an integer of 1 or more, preferably an integer of 1 to 12, more preferably an integer of 1 to 6, and particularly preferably 1.

Preferred specific examples of structural units including $X^1$ in formula (1) include, but are not limited to, structural units derived from 2-methacryloyloxyethyl phosphorylcholine, 2-acryloyloxyethyl phosphorylcholine, N-(2-methacrylamide) ethyl phosphorylcholine, 4-methacryloyloxybutyl phosphorylcholine, 6-methacryloyloxyhexyl phosphorylcholine, 10-methacryloyloxydecyl phosphorylcholine, ω-methacryloyldioxyethylene phosphorylcholine, and 4-styryloxybutyl phosphorylcholine, etc. Among them, structural units derived from 2-methacryloyloxyethyl phosphorylcholine are particularly preferred. As 2-methacryloyloxyethyl phosphorylcholine (MPC) and other phosphorylcholine-based compounds (monomer compounds), commercially-available products can be used, or alternatively, such compounds can be easily prepared based on ordinary, methods.

Preferred specific examples of structural units including $X^2$ in formula (1) include, but are not limited to, structural units derived from a monomer compound represented by formula (b1) or (b2):

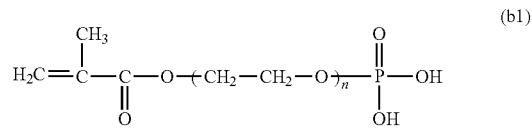

(b1)

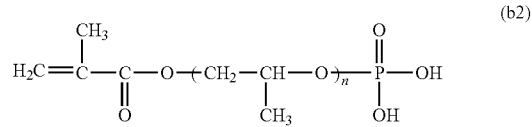

(b2)

In formula (b1) or (b2) above, n represents an integer of 1 or more, preferably an integer of 1 to 12, more preferably an integer of 1 to 6, and particularly preferably 1.

From the viewpoint of solubility in a polymerization solvent, more preferred is a compound of formula (b1), and particularly preferred is a compound of formula (b1) in which n is 1.

The monomer compound which can constitute the structural unit including $X^2$ can be prepared according to an ordinary method based on the state of the art. Alternatively, it is possible to use commercially-available products including Phosmer M, Phosmer PP (compounds of formula (b2) in which n is 5 to 6), Phosmer PE (compound of formula (b1) in which n is 4 to 5) and Phosmer M (compound of formula (b1) in which n is 1) manufactured by Unichemical Co., Ltd. and P-1M (compound of formula (b1) in which n is 1) manufactured by Kyoeisha Chemical Co., Ltd.

In the polymer structure represented by formula (1), the structural unit including $X^1$ and the structural unit including $X^2$ may be bound in random order to form a random polymer or may form a block polymer.

Further, as the structural unit including $X^1$ and/or the structural unit including $X^2$, one type may be used solely, or a plurality of types may be used in combination.

Preferred specific examples of polymers having the structure represented by general formula (1) above include, but are not limited to, a polymer having a structure represented by general formula (2):

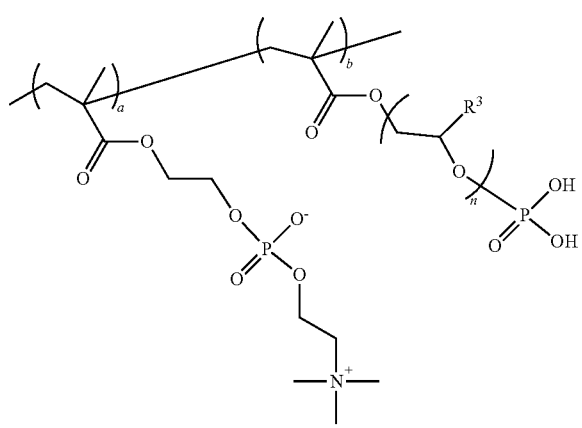

(2)

In formula (2): $R^3$ represents a hydrogen atom or a $C_{1-3}$ alkyl group; a and b each independently represent an integer of 2 or more; n represents an integer of 1 or more; and respective monomer units are bound in random order.

In formula (2), a structural unit having a side chain containing a phosphorylcholine group (also referred to as "the MPC unit") and a structural unit having a side chain containing a phosphoric acid group (also referred to as "the PA unit") may be bound in random order like formula (1) and there is no limitation thereon.

In formula (2), $R^3$ represents a hydrogen atom or a $C_{1-3}$ linear or branched alkyl group. From the viewpoint of solubility in a polymerization solvent, $R^3$ is preferably a hydrogen atom or a methyl group, and more preferably a hydrogen atom.

In formula (2), n represents an integer of 1 or more, preferably an integer of 1 to 12, more preferably an integer of 1 to 6, and particularly preferably 1.

In the polymer represented by formula (1) or (2) above, a and b are not particularly limited as long as they are each independently an integer of 2 or more. In this regard, the value of a/(a+b) is preferably 0.10 to 0.99, more preferably 0.30 to 0.99, and even more preferably 0.60 to 0.95.

The weight-average molecular weight of the polymer represented by formulae (1) and (2) above is not limited, but for example, it is preferably 15,000 to 600,000. The weight-average molecular weight of the polymer can be measured by a gel permeation chromatography (GPC) method.

The polymer having the structure represented by formula (1) or (2) above may contain a structural unit derived from another monomer according to need. Usually, the ratio of the structural unit derived from another monomer is preferably 30 mol % or less, and more preferably 10 mol % or less relative to all the structural units constituting the polymer (100 mol %).

2. Method for Producing Polymer Compound

Basically, synthesis of the polymer represented by formula (1) or (2) can be performed by an ordinary method based on the state of the art. Examples of such methods include a method of radically polymerizing monomers including the monomer constituting the MPC unit and the monomer constituting the PA unit using a polymerization initiator. Examples of radical polymerization methods include a method using a redox polymerization initiator (Method 1) and a method using a radical polymerization initiator (Method 2).

(Method 1)

The polymer compound represented by formula (1) or (2) is synthesized preferably by redox polymerization using a redox polymerization initiator, and more preferably by solution polymerization. Surprisingly, the present inventors found that polymer compounds with various compositions are obtained by polymerizing monomers including the monomer constituting the MPC unit and the monomer constituting the PA unit with use of a redox polymerization initiator in an aqueous solvent while suppressing gelation and precipitation. According to this method, precipitation and gelation of polymerized products can be suppressed, and it is possible to obtain a copolymer having a high molecular weight (for example, a weight-average molecular weight of 15,000 to 600,000) which can be immobilized to the substrate surface by means of a chemical bond. The weight-average molecular weight can be measured by gel permeation chromatography (GPC) (eluant: phosphate buffer, polyethylene glycol standard, detection by UV (210 nm) and refractive index).

The polymer compound obtained by the present invention is water-soluble, and an aqueous solution of the polymer compound obtained after redox polymerization may be directly used for coating (surface treatment) to the substrate. This makes it possible to omit freeze-drying, resulting in energy saving and cost saving.

Further, a redox polymerization reaction can be performed at room temperature (about 10° C. to about 35° C.). The reaction at room temperature is preferred on the point that heating, etc. are not required and that the production cost can be reduced.

Further, by aqueous polymerization and coating with an aqueous solution, the problem of a volatile organic compound (VOC) can be avoided.

Examples of the aqueous solvent include water, and a mixed solvent of water and organic solvents such as alcohols including isopropyl alcohol and ketones including acetone. Since the MPC polymer may be insoluble in a water/alcohol solvent, a water/alcohol solvent having an alcohol content of 70% by volume or less or water is more preferred, and particularly preferably, water is used solely (for example, see: Y. Kiritoshi and K. Ishihara, "Preparation of cross-linked biocompatible poly(2-methacryloyloxyethyl phosphorylcholine) gel and its strange swelling behavior in water/ethanol mixture." *J. Biomater. Sci. Polymer Edn,* 13, 213-224 (2002); and Y. Kiritoshi and K. Ishihara, "Molecular recognition of alcohol by volume phase transition of cross-linked poly(2-methacryloyloxyethyl phosphorylcholine) gel." *Sci. Technol. Adv. Mater,* 4, 93-98 (2003)).

For the redox polymerization reaction, a redox polymerization initiator in which an oxidant is combined with a reducing agent (polymerization promoter) is used. A water-soluble redox polymerization initiator is preferred. Examples of the oxidant include hydrogen peroxide, ammonium persulfate, potassium persulfate and sodium persulfate. These oxidants may be used solely, or a plurality of them may be used in combination. Among them, ammonium persulfate (APS), potassium persulfate and sodium persulfate are preferred, and particularly preferred is ammonium persulfate which has high water solubility. As the reducing agent, an already-known reducing agent can be used. Examples thereof include a metal ion of iron, copper, silver, cerium, cobalt, nickel or the like, hydroxymethane sulfinate, ethylenediaminetetraacetic acid (EDTA) or a salt thereof, N,N,N',N'-tetramethylethylenediamine (TMEDA), water-soluble thiosulfate and sulfite (e.g., sodium sulfite), and preferred are amine compounds such as N,N,N',N'-tetramethylethylenediamine (TMEDA). It is inferred that the monomer constituting the PA unit having a phosphonic acid group is neutralized when amine is present, and that gelation can be further suppressed when a salt structure is formed. It is desirable that when using amine as the reducing agent, after polymerization, an acid (e.g., phosphoric acid) is added to the aqueous solution of polymer to be acidic to desalinate the polymer compound. It is because coating property is improved by desalination. In a preferred embodiment, after polymerization, phosphoric acid or the like is added to the obtained aqueous solution of polymer to be acidic and ultrafiltration is performed. In this way, coating property is improved by desalination of the polymer compound, and in addition, diamine which is desalinated from the PA unit forms a salt together with phosphoric acid, and this can be easily removed.

Particularly preferred is a combination of ammonium persulfate and N,N,N',N'-tetramethylethylenediamine.

The amount of the oxidant to be used in the redox polymerization initiator is preferably 0.0001 to 3 parts by weight, more preferably 0.001 to 2 parts by weight, and particularly preferably 0.05 to 1 parts by weight relative to the total weight of the monomer to be used for polymerization (100 parts by weight). The amount of the reducing agent to be used is preferably 0.001 to 15 parts by weight, and more preferably 0.01 to 15 parts by weight relative to the total weight of the monomer to be used for polymerization (100 parts by weight).

The polymerization temperature of the redox polymerization reaction is not particularly limited, but for example, it is preferably 0° C. to 100° C., more preferably 10° C. to 90° C., and most preferably 20 to 40° C. When the polymerization temperature is within the above-described range, the polymerization rate is appropriate and can be easily controlled, and the productivity and stability of the polymer are excellent. The redox polymerization reaction can be performed at room temperature (about 10° C. to about 35° C.). The reaction at room temperature is preferred on the point that heating, etc. are not required and that the production cost can be reduced.

The reaction is performed in an aqueous solvent. In this regard, the concentration of an aqueous solution of the monomer is not particularly limited. The reaction time is not particularly limited, but for example, it is 1 to 6 hours.

(Method 2)

The polymer compound of the present invention can be synthesized by radical polymerization using a radical polymerization initiator under specific conditions. Specifically, solution polymerization in an organic solvent is preferred.

The radical polymerization initiator to be used for polymerization is not particularly limited, and examples thereof include azo-based initiators such as 2,2'-azobisisobutyronitrile (AIBN), 2,2'-azobis(2,4-dimethylvaleronitrile), 2,2'-azobis(2-amidinopropane)dihydrochloride, 4,4'-azobis(4-cyanopentanoic acid) and 2,2'-azobis(4-methoxy-2,4-dimethylvaleronitrile) and peroxide-based initiators such as benzoyl peroxide, t-butyl hydroperoxide and potassium persulfate.

The amount of the radical polymerization initiator to be used can be adjusted depending on polymerizability of the monomer and a molecular weight of polymer required, but it is preferably 0.001 to 3 parts by weight, and more preferably 0.01 to 1 parts by weight relative to the total weight of the monomer (100 parts by weight).

As the solvent to be used for radical polymerization, for example, an organic solvent such as ethyl acetate, methanol, ethanol, 1-propanol, 2-propanol, 1-butanol, acetone, dioxane, N,N-dimethylformamide, N,N-dimethylacetamide, benzene, toluene, acetonitrile, methylene chloride, chloroform and dichloroethane and a mixed solvent thereof can be used. Preferred is an alcohol-based solvent such as methanol, ethanol, 1-propanol, 2-propanol and 1-butanol.

Meanwhile, use of an aqueous solvent such as water and a water-containing organic solvent as the solvent to be used for radical polymerization is not preferred. In the case of radical polymerization in an aqueous solvent, usually, a cross-linking reaction between phosphonic acid groups of the PA unit proceeds, and as a result, the polymer compound forms microgel to cause gelation. Accordingly, in a polymer product in the case where gelation is caused, the phosphonic acid group that is a reactive site for the substrate surface is decreased and/or lost, and when using the product as the treatment agent, immobilization to the substrate may become insufficient or difficult.

In the case where polymerization is performed by the method (2), when the content ratio of the PA unit (structural unit including $X^2$) increases, precipitation occurs and it may become difficult to obtain a high-molecular-weight polymer. For example, precipitation often occurs in the case of radical polymerization in an alcohol-based solvent. From the viewpoint of this, when using the method (2), the ratio of the PA unit is preferably 5 mol % or less (i.e., $a/(a+b)=0.95$ to 0.99).

The polymerization temperature may be suitably set depending on the molecular weight of a polymer to be produced, the type of an initiator, etc., but it is usually 30 to 100° C.

After polymerization is performed according to the above-described method 1 or 2 or the like, the obtained polymer solution is purified according to need. The method for purification is not particularly limited, and for example, it may be performed by means of ultrafiltration. In particular, when using amine as the reducing agent for redox polymerization (the above-described method 1), an acid (e.g., phosphoric acid) is added to an aqueous solution of polymer after polymerization to make the solution acidic and ultrafiltration is performed, then diamine is desalinated from the PA unit to form a salt together with phosphoric acid, and it can be easily removed, and therefore it is preferred. The solution after purification may be directly used for the surface treatment of the substrate, or may be subjected to a freeze-drying treatment. The polymer compound after freeze-drying is water-soluble, and it can be dissolved in water to be used as a surface treatment agent.

Note that as described above, in the method using the redox polymerization initiator (method 1), precipitation and gelation of the polymerized product are suppressed and the obtained polymer compound is water-soluble, and therefore, the aqueous solution after polymerization may be directly used to perform coating (surface treatment) to the substrate.

The method 1 can be carried out at room temperature and is more advantageous in terms of the production cost when compared to the method using the radical polymerization initiator (method 2) which is generally accompanied by heating.

Meanwhile, in the method using the radical polymerization initiator (method 2), when using an aqueous solvent, gelation may occur. Once a product is gelled, even when it is dissolved in a large amount of water, a microgel state is formed, and for this reason, immobilization to the substrate surface may be insufficient or difficult. When using an organic solvent, gelation can be suppressed, but when the content ratio of the PA unit (structural unit including $X^2$) increases, precipitation more easily occurs. Such a product in which precipitation occurs can be subjected to purification and freeze-drying, and then dissolved in water to be used for aqueous solution coating. However, when precipitation occurs, an unreacted monomer or oligomer may be included therein, and it may be difficult to carry out purification or the yield may be reduced, and it is not preferred when compared to the polymer produced by the method using the redox polymerization initiator of the above-described method 1.

3. Surface Treatment Agent

The surface treatment agent of the present invention contains the above-described polymer compound and can hydrophilize the substrate surface. As described later, the surface treatment can be performed by applying the surface treatment agent to the substrate surface.

The surface treatment agent of the present invention may contain any component other than the above-described polymer compound generally used as a component of a substrate surface treatment agent (e.g., various solvents, pH adjuster, etc.), and there is no limitation thereon. Preferred examples of the solvent include water and a mixed solvent of water and alcohol, and water is particularly preferred.

The pH adjuster is not particularly limited, and publicly-known pH adjusters can be used. Among them, inorganic salts are preferred. Examples of the pH adjuster include a phosphate such as disodium hydrogen phosphate and sodium dihydrogen phosphate; and a carbonate such as sodium hydrogen carbonate and sodium carbonate. As the phosphate, disodium hydrogen phosphate dihydrate or disodium hydrogen phosphate dodecahydrate is preferred. For adjusting pH to be a desired value, a base such as sodium hydroxide and potassium hydroxide; an acid such as sulfuric acid, hydrochloric acid and nitric acid; etc. may be used in combination.

Usually, the surface treatment agent of the present invention is preferably in the form of a solution, and more preferably in the form of an aqueous solution.

The concentration of the aforementioned binary polymer is, for example, preferably 0.05% by weight or more, and more preferably 0.1% by weight or more. The upper limit of the concentration of the polymer is not particularly limited as long as a homogeneous solution of the polymer is obtained, but for example, in consideration of the viscosity of the solution, it is preferably 5% by weight or less, and more preferably 2% by weight or less.

When using the treatment agent of the present invention in the form of the solution, the pH thereof is, for example, 3 to 11, and preferably 3 to 7.

4. Surface Treatment

The surface treatment method of the present invention is a method for hydrophilizing a surface of a substrate that is a target substrate, and specifically, it is a method comprising applying the above-described surface treatment agent of the present invention to the substrate surface (application process). According to this method, a surface-treated substrate, which has a substrate and a hydrophilic coating layer on at least one of the surfaces of the substrate, is obtained.

The method for applying the surface treatment agent to the substrate surface is not particularly limited, and examples thereof include methods according to a roll coating method, a bar coating method, a spray treatment method, an immersion treatment method, etc. Among them, preferred is an immersion treatment method in which the substrate is immersed in the surface treatment agent. The immersion time is not particularly limited, but it is usually 10 to 60 minutes. After application of the surface treatment agent, drying is performed, thereby forming the hydrophilic coating layer on the substrate. The drying conditions are not particularly limited, and drying is usually performed at 60 to 120° C. for 60 to 180 minutes.

The thickness of the hydrophilic coating layer is not particularly limited and may be suitably determined depending on the intended use. Usually, the hydrophilic coating layer is formed by a layer of the above-described polymer compound immobilized on the substrate surface via a chemical bond. For example, the thickness of the hydrophilic coating layer is preferably 30 to 100 nm. The thickness of the hydrophilic coating layer can be controlled by controlling the structure of the polymer compound as the surface treatment agent (for example, n in formulae (1) and (2)).

The substrate to be targeted by the surface treatment method of the present invention is not limited. Examples thereof include a glass substrate, a silicon substrate, a metal substrate (including an alloy), a metal oxide substrate, a silicone rubber substrate, a silicone hydrogel substrate and a ceramic substrate.

The shape of the substrate is not particularly limited, and examples thereof include a plate-like shape, a bead-like shape, a fiber-like shape, and a shape in which a hole or groove is provided in a plate-like substrate.

Further, the intended use of the substrate is not limited, and examples thereof include a dental material, a dental device, various medical devices, a contact lens, an artificial organ, a biochip, a biosensor, a medical apparatus such as an oxygen enriching film and a cell preservation apparatus, an automobile windshield and a ship bottom paint. Preferred examples of the dental material include a dental prosthesis such as a plate denture, a bridge, an implant denture and a crown, an orthodontic material and a denture liner.

For the purpose of improving adhesiveness between the surface treatment agent and the substrate, the surface activation treatment is preferably performed before application of the surface treatment agent. Examples of the surface activation treatment method include plasma treatment, UV/ozone cleaning, corona discharge treatment, flame treatment, ozone water treatment and hydrogen peroxide solution/Fenton reaction solution treatment.

In particular, when the above-described treatment is performed on the surface of a substrate including a siloxane bond such as a silicon substrate, a glass substrate and a silicone rubber substrate, a silanol group is activated, the formation of a chemical bond with a phosphonic acid residue described later is promoted, and as a result, adhesion and immobilization force can be improved.

Among the above-described surface activation treatments, an oxygen plasma treatment is preferred. Since a hydroxyl group and a carboxy group are produced on the substrate surface by the oxygen plasma treatment, hydrophilicity of the surface is improved, and this makes it possible to improve the adhesive effect of the polymer compound that is hydrophilic to the substrate.

(Immobilization to Substrate Surface)

The surface treatment agent of the present invention may be physically immobilized to the substrate via physical interaction, but is preferably immobilized chemically via a chemical bond.

The polymer compound of the present invention has a phosphonic acid group ($-P(=O)(OH)_2$) in the side chain of the structural unit including $X^2$ (PA unit). The polymer compound can be chemically immobilized to the substrate surface by a dehydration condensation reaction of the phosphonic acid group with a functional group that can interact with the phosphonic acid group on the substrate surface.

The functional group that can interact with the phosphonic acid group is not particularly limited, and examples thereof include a silanol group (Si—OH), a titanol group (Ti—OH) and a Zr—OH group. When these groups are reacted with the phosphonic acid group, a phosphorus atom (P) of the phosphonic acid group is bound to a silicon atom (Si) or a titanium atom (Ti) or a zirconium atom (Zr) of the silanol group (Si—OH) or the titanol group (Ti—OH) or the Zr—OH group via an oxygen atom (O).

Examples of the substrate whose surface contains the functional group that can interact with the phosphonic acid group include a glass substrate, a silicon substrate, a titanium substrate, a zirconium substrate, a silicone rubber substrate, a silicone hydrogel substrate and a Nitinol (Ni—Ti alloy) substrate. As the silicone rubber substrate, various silicone rubbers such as polydimethylsiloxane (PDMS) can be used, and a substituted silicone and a modified silicone are included therein. Other than the substrates listed above, when using a substrate whose surface has the functional group that can interact with the phosphonic acid group, the polymer compound of the present invention can be immobilized to the substrate surface by a dehydration condensation reaction with the polymer compound without the treatment using a silane coupling agent or a titanate coupling agent described later.

Accordingly, the surface treatment of these substrates can be performed according to a method which comprises:
(1) carrying out at least one selected from the group consisting of plasma treatment, UV/ozone cleaning, corona discharge treatment, flame treatment, ozone water treatment, and hydrogen peroxide solution/Fenton reaction solution treatment according to need; and
(2) applying the above-described surface treatment agent onto the substrate, followed by drying. By the surface treatment, the hydrophilic coating layer can be formed on the substrate, and the surface-treated substrate having the hydrophilic coating layer on at least one of the surfaces of the substrate is obtained thereby.

In the case of the silicone rubber substrate or silicone hydrogel substrate, among the above-described surface activation treatment methods, the oxygen plasma treatment is preferably performed on the substrate before application of the surface treatment agent. This makes it possible to effectively introduce the silanol group (Si—OH) into the substrate surface. The conditions for the oxygen plasma treatment are not particularly limited, and it is sufficient when an active hydroxyl group is introduced into the surface under the conditions. For example, the discharge output is preferably 20 to 60 W, and the oxygen flow rate is preferably 20 to 40 ml/min $O_2$. Further, the temperature and the treatment time for the oxygen plasma treatment are not particularly limited, but the treatment time is preferably 1 to 5 minutes.

Specifically, the surface treatment of these substrates can be performed according to a method which comprises:
(1) carrying out the oxygen plasma treatment; and
(2) applying the above-described surface treatment agent onto the substrate, followed by drying. By the surface treatment, the hydrophilic coating layer can be formed on the silicone rubber substrate or silicone hydrogel substrate without the treatment with a silane coupling agent or a titanate coupling agent which is conventionally required, and the surface-treated substrate having the hydrophilic coating layer on at least one of the surfaces of the substrate is obtained thereby.

In one embodiment, in the case of a substrate, which does not contain any functional group that can chemically interact with the phosphonic acid group in the surface thereof, or which does not easily interact chemically with the phosphonic acid group, it is preferred to introduce the functional group that can interact with the phosphonic acid group into at least a part of the substrate surface before application of the surface treatment agent. The surface treatment agent can be effectively immobilized chemically even to such a substrate thereby.

Specific examples of the method include a method of treating the substrate with a silane coupling agent or a titanate coupling agent. For example, the silane coupling agent or titanate coupling agent may be applied to the substrate according to an conventional method. According to the method, the substrate surface is vitrified, and the substrate surface having the silanol group (Si—OH) and the titanol group (Ti—OH) can be obtained. The silane coupling agent is not particularly limited, and a conventionally-known product can be used. Examples thereof include silane alkoxides such as a tetraalkoxysilane (e.g., tetraethoxysilane (TEOS) and tetramethoxysilane). Among them, TEOS is preferred. The titanate coupling agent is not particularly limited, and a conventionally-known product can be used. Examples thereof include organic titanate. As the titanate coupling agent, a commercially-available product can be utilized, and for example, "ORGATIX" series manufactured by Matsumoto Fine Chemical Co., Ltd., etc. can be preferably used.

Examples of the substrate which can be treated with the silane coupling agent or titanate coupling agent include a substrate of a metal other than titanium (e.g., stainless steel substrate, aluminum substrate, copper substrate, etc.), a substrate of a metal oxide such as $Al_2O_3$, $TiO_2$, $ZrO_2$, silicon oxide ($SiO_2$), $Ta_2O_5$, mica, hydroxyapatite, ZnO, ITO and IGZO, and a ceramic substrate.

In addition, the treatment can also be applied to a substrate of a polymer such as an acrylic polymer including polymethyl methacrylate (methacrylic resin; PMMA), polystyrene, polyethylene telephthalate, polycarbonate, and polyolefin including polyethylene and polypropylene.

Among the substrates mentioned above, for example, regarding the stainless steel substrate, there is a product with a composition having a functional group that can interact with the phosphonic acid group in the surface thereof. In this case, the treatment with the silane coupling agent or titanate coupling agent is not required, and the polymer compound can be immobilized to the surface by the above-described dehydration condensation reaction with the phosphonic acid group.

Specifically, in one embodiment, the surface treatment can be performed according to a method which comprises:
(1) treating the substrate with the silane coupling agent or titanate coupling agent;
(2) carrying out at least one selected from the group consisting of plasma treatment, UV/ozone cleaning, corona discharge treatment, flame treatment, ozone water treatment, and hydrogen peroxide solution/Fenton reaction solution treatment according to need; and
(3) applying the above-described surface treatment agent onto the substrate, followed by drying. By the surface treatment, the hydrophilic coating layer can be formed on the substrate via an adhesive layer (layer containing the silane coupling agent or titanate coupling agent), and the surface-treated substrate having the hydrophilic coating layer on at least one of the surfaces of the substrate is obtained thereby.

The present inventors tried to improve the surface treatment method for substrates which do not contain any functional group that can interact with the phosphonic acid group in various ways, and surprisingly, the present inventors found that even in the case of omitting treating the substrate with the silane coupling agent or titanate coupling agent, by changing treatment conditions for the plasma treatment process (change of the type of machine, change of the treatment time), a substrate which is supposed not to contain any functional group that can interact with the phosphonic acid group shows a water contact angle equivalent to that of a substrate subjected to the pretreatment with the silane coupling agent or the like and then the MPC coating treatment.

Specifically, in one embodiment, a method comprises:
(1) carrying out at least one selected from the group consisting of plasma treatment, UV/ozone cleaning, corona discharge treatment, flame treatment, ozone water treatment, and hydrogen peroxide solution/Fenton reaction solution treatment; and
(2) applying the above-described surface treatment agent onto the substrate, followed by drying. By the method, the hydrophilic coating layer can be formed on the substrate, and the surface-treated substrate having the hydrophilic coating layer on at least one of the surfaces of the substrate is obtained thereby.

In addition, the surface treatment of the substrate (for example, a substrate which does not contain any functional group that can interact with the phosphonic acid group) can also be performed by adding the silane coupling agent and/or titanate coupling agent to the above-described surface treatment agent and performing a reaction under the coexistence of the above-described polymer compound and the silane coupling agent and/or titanate coupling agent. Specifically, the surface treatment can be performed by a method which comprises:
(1) carrying out at least one selected from the group consisting of plasma treatment, UV/ozone cleaning, corona discharge treatment, flame treatment, ozone water treatment, and hydrogen peroxide solution/Fenton reaction solution treatment according to need; and
(2) applying a surface treatment agent, which contains the above-described polymer compound and at least one of the silane coupling agent and the titanate coupling agent, onto the substrate, followed by drying. By the surface treatment, the hydrophilic coating layer can be formed on the substrate, and the surface-treated substrate having the hydrophilic coating layer on at least one of the surfaces of the substrate is produced thereby. According to the method, the hydrophilic coating layer can be constructed with an organic-inorganic hybrid structure, and in this case, the phosphonic acid residue exhibits acid catalyst effects. Specifically, when phosphonic acid in the polymer side chain is proton-dissociated in an aqueous solution, the aqueous solution of the surface treatment agent shows a low pH (3 to 4) and can function as an acid catalyst. Accordingly, by the coexistence of the aqueous solution of the surface treatment agent and the silane coupling agent and/or the titanate coupling agent, hydrolysis of the silane coupling agent proceeds, and subsequently the dehydration condensation reaction of the silanol group or titanol group with the phosphonic acid group occurs, thereby constructing a three-dimensional organic-inorganic hybrid structure on the substrate surface.

EXAMPLES

Hereinafter, the present invention will be more specifically described by way of working examples, but the present invention is not limited thereto. The "room temperature" in the working examples below usually means about 10° C. to about 35° C.

The abbreviations used in the working examples are well-known and commonly-used abbreviations for those skilled in the art. Several abbreviations are as follows:

EtOH: ethanol

MeOH: methanol iso-PrOH: isopropanol

AC: acetone

TOL: toluene n-: normal

TEOS: tetraethoxysilane

<Synthesis of MPC Polymer>

Synthesis of binary copolymer (PMPh, formula below) using 2-methacryloyloxyethyl phosphorylcholine (MPC)

(C11H22NO6P Mw=295.27 CAS 67881-98-5) and Phosmer M (acid phosphoxy ethyl methacrylate) (C6H11O6P Mw=210.12 CAS 24599-21-1) as monomers PMPh

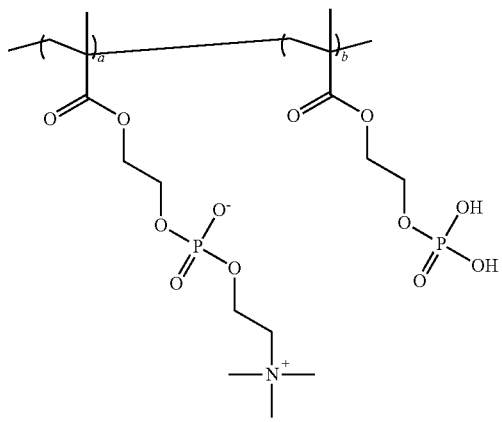

1. Polymerization Using Redox Polymerization Initiator
(Synthesis of PMPh 1 to PMPh 8)

Using the above-described MPC and Phosmer M as monomers, ammonium persulfate (APS) as the redox polymerization initiator (oxidant) and N,N,N',N'-tetramethylethylenediamine (TMEDA) as the polymerization promoter (reducing agent), with a blending ratio shown in Table 1A, the materials were dissolved in 15 mL of pure water as the reaction solvent so that the monomer concentration became 0.5 mol/L. After that, the solution was transferred to a test tube, and oxygen in the system was removed by argon bubbling (20 minutes). The tube was sealed using a gas burner, and a polymerization reaction was performed at room temperature (24 hours). After that, the tube was opened, the solution was mixed with 600 mL of water, continuous ultrafiltration was performed using an ultrafiltration apparatus (Gengoroh manufactured by Techno-Office of Kaneko), an unreacted material was removed and collected, and freeze-drying was performed, thereby obtaining a sample shown in Table 1A.

TABLE 1A

| | | Monomer composition (molar ratio) | | Initiator (oxidant + reducing agent) | | | Results | |
|---|---|---|---|---|---|---|---|---|
| No. | Polymer sample | MPC (mol %) | Phosmer M (mol %) | Amount of initiator[1] (parts by weight) | Type | Reaction solvent | | Water solubility[2] |
| 1 | PMPh 1 | 99 | 1 | 0.1 + 2.5 | APS + TMEDA | Water | Transparent | ○ |
| 2 | PMPh 2 | 95 | 5 | 0.1 + 2.5 | APS + TMEDA | Water | Transparent | ○ |
| 3 | PMPh 3 | 90 | 10 | 0.5 + 12.5 | APS + TMEDA | Water | Transparent | ○ |
| 4 | PMPh 4 | 50 | 50 | 0.5 + 12.5 | APS + TMEDA | Water | Transparent | ○ |
| 5 | PMPh 5 | 30 | 70 | 0.5 + 12.5 | APS + TMEDA | Water | Transparent | ○ |
| 6 | PMPh 6 | 90 | 10 | 0.1 + 2.5 | APS + TMEDA | Water | Transparent | ○ |
| 7 | PMPh 7 | 50 | 50 | 0.1 + 2.5 | APS + TMEDA | Water | Transparent | ○ |
| 8 | PMPh 8 | 30 | 70 | 0.1 + 2.5 | APS + TMEDA | Water | Transparent | ○ |

[1]The amount (parts by weight) of the initiator is based on the total weight (100 parts by weight) of the monomer.
[2]Evaluation of water solubility was made according to criteria below.
○: Transparent when visually evaluated.
Δ: Cloudy when visually evaluated.

(Used Monomer Structures)

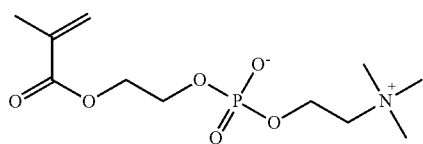

2-methacryloyloxyethyl phosphorylcholine (MPC)

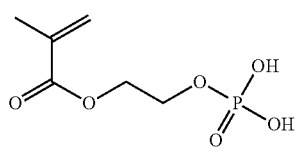

Phosmer M (Acid Phosphoxy Ethyl Methacrylate)

According to the above-described results, transparent water-soluble polymers were obtained without occurrence of precipitation and gelation with various compositions (MPC:Phosmer=99:1 to 30:70 (molar ratio)) by performing redox polymerization in the aqueous solvent.

In the above-described case, ultrafiltration, purification and freeze-drying were carried out after the production of the copolymer, but the obtained aqueous solution can be directly used as the surface treatment agent for MPC polymer coating.

(Synthesis of PMPh w9, PMPh w11)

Using the above-described MPC monomer and Phosmer M as monomers, ammonium persulfate (APS) as the redox polymerization initiator (oxidant) and N,N,N',N'-tetramethylethylenediamine (TMEDA) as the polymerization promoter (reducing agent), with a blending ratio shown in Table 1B, the materials were dissolved in 15 mL of pure water as the reaction solvent so that the monomer concentration became 0.5 mol/L. After that, the reaction solution was transferred to a test tube, and oxygen in the system was removed by argon bubbling (20 minutes). The tube was sealed using a gas burner, and a polymerization reaction was performed at room temperature (24 hours). After that, the tube was opened, the solution was mixed with 600 of water, phosphoric acid was further added thereto for pH adjustment, continuous ultrafiltration was performed using an ultrafiltration apparatus (Gengoroh manufactured by Techno-Office of Kaneko), an unreacted material was removed and collected, and freeze-drying was performed, thereby obtaining, a sample shown in Table 1B. In the case of PMPh w11, pH adjustment was carded out using hydrochloric acid instead of phosphoric acid.

erization initiator or 2,2'-azobis(4-methoxy-2,4-dimethyl-valeronitrile) (V-70) (Mw=308.43 CAS 15545-97-8) that is a low-temperature radical polymerization initiator, with a blending ratio shown in Table 2, the materials were dissolved in 15 mL of a reaction solvent so that the monomer concentration became 0.5 mol/L. After that, the solution was transferred to a test tube, and oxygen in the system was removed by argon bubbling at 0° C. (20 minutes). The tube was sealed using a gas burner, and a polymerization reaction was performed in oil bath, which was kept at 60° C. when

TABLE 1B

| No. | Polymer sample | Monomer composition (molar ratio) | | Initiator (oxidant + reducing agent) | | | | Results | |
|-----|----------------|------|------|------|------|------|------|------|------|
| | | MPC (mol %) | Phosmer M (mol %) | Amount of initiator[*1] (parts by weight) | Type | Reaction solvent | pH adjustment | | Water solubility[*2] |
| w9 | PMPh w9 | 70 | 30 | 0.1 + 135 | APS + TMEDA | Water | Phosphoric acid | Transparent | ○ |
| w11 | PMPh w11 | 90 | 10 | 0.1 + 27 | APS + TMEDA | Water | Hydrochloric acid | Transparent | ○ |

[*1]The amount (parts by weight) of the initiator is based on the total weight (100 parts by weight) of the monomer.

[*2]Evaluation of water solubility was made according to criteria below.

○: Transparent when visually evaluated.

Δ: Cloudy when visually evaluated.

2. Polymerization Using Radical Polymerization Initiator 2-1 Reaction Using Radical Polymerization Initiator or Low-Temperature Radical Polymerization Initiator (Synthesis of PMPh 9 to PMPh 19)

Using the above-described MPC and Phosmer M as monomers and 2,2'-azobisisobutyronitrile (AIBN) (C8H12N4 Mw=164.21 CAS 78-67-1) as the radical polymusing AIBN and at 30° C. when using V-70 (24 hours). After that, the tube was opened, the solution was mixed with 600 mL of water, continuous ultrafiltration was performed using an ultrafiltration apparatus (Gengoroh manufactured by Techno-Office of Kaneko), an unreacted material and the solvent were removed and collected, and freeze-drying was performed, thereby obtaining a sample shown in Table 2.

TABLE 2

| No. | Polymer sample | Monomer composition (molar ratio) | | Initiator | | Reaction solvent | Results | |
|-----|----------------|------|------|------|------|------|------|------|
| | | MPC (mol %) | Phosmer M (mol %) | Amount of initiator[*1] (parts by weight) | Type | | | Water solubility[*2] |
| 9 | PMPh 9 | 99 | 1 | 0.5 | AIBN | EtOH | Transparent | ○ |
| 10 | PMPh 10 | 95 | 5 | 0.5 | AIBN | EtOH | Cloudy | ○ |
| 11 | PMPh 11 | 90 | 10 | 0.5 | AIBN | EtOH | Precipitated | ○ |
| 12 | PMPh 12 | 75 | 25 | 0.5 | AIBN | EtOH | Precipitated | ○ |
| 13 | PMPh 13 | 50 | 50 | 0.5 | AIBN | EtOH | Precipitated | ○ |
| 14 | PMPh 14 | 90 | 10 | 0.5 | AIBN | MeOH | Precipitated, Viscous | ○ |
| 15 | PMPh 15 | 90 | 10 | 0.5 | AIBN | iso-PrOH | Precipitated | ○ |
| 16 | PMPh 16 | 50 | 50 | 0.5 | AIBN | AC/EtOH = 1/1 | Precipitated | ○ |
| 17 | PMPh 17 | 50 | 50 | 0.5 | AIBN | TOL/EtOH = 1/1 | Precipitated | ○ |
| 18 | PMPh 18 | 90 | 10 | 0.5 | V-70 | EtOH | Precipitated | ○ |
| 19 | PMPh 19 | 50 | 50 | 0.5 | AIBN | Water/EtOH = 1/1 | Gelled | Δ |

[*1]The amount (parts by weight) of the initiator is based on the total weight (100 parts by weight) of the monomer.

[*2]Evaluation of water solubility was made according to criteria below.

○: Transparent when visually evaluated.

Δ: Cloudy when visually evaluated.

In the case of radical polymerization in the alcohol-based solvent, when the composition of Phosmer M was 5 mol % or more, precipitation occurred during synthesis (Nos. 9-18). This was the same even in the case of using the low-temperature radical polymerization initiator (V-70; 30° C.). In the case where cloudiness or precipitation occurred during polymerization, there is a high possibility that the molecular weight did not reach an expected value. Meanwhile, in the case where the water-containing solvent (aqueous solution) was used as the reaction solution, gelation was promoted.

Among the synthesized polymers, the polymers in which precipitation was caused (PMPh 9 to PMPh 18) can be dissolved in water and each aqueous solution can be used for coating. Meanwhile, in the case of the polymer in which gelation was caused (PMPh 19), even when it is dissolved in water, microgel is formed, and it cannot be used for aqueous solution coating, and in addition, it cannot be immobilized to the substrate surface.

2-2 Reaction Using Water-Soluble Radical Polymerization Initiator
(Synthesis of PMPh 20 to PMPh 23)

Using the above-described MPC and Phosmer M as monomers and a water-soluble radical polymerization initiator (2,2'-azobis[N-(2-carboxyethyl)-2-methylpropionamidine]tetrahydrate VA-057 (Mw=414.46 CAS 1041483-94-6)) as the initiator, with a blending ratio shown in Table 3, the materials were dissolved in 15 mL of pure water, aqueous solution of NaOH (pH 11.8) or aqueous solution of sulfuric acid (pH 2.0) so that the monomer concentration became 0.5 mol/L. After that, the solution was transferred to a test tube, and oxygen in the system was removed by argon bubbling at 0° C. (20 minutes). The test tube was sealed using a gas burner, and a polymerization reaction was performed in oil bath at 60° C. (24 hours). After that, the tube was opened, the solution was mixed with 600 mL of water, continuous ultrafiltration was performed using an ultrafiltration apparatus (Gengoroh manufactured by Techno-Office of Kaneko), and an unreacted material was removed. Collection and freeze-drying were carried out, thereby obtaining a sample shown in Table 3.

In the case of radical polymerization in the aqueous solution, gelation occurred. Gelation also occurred even in the case where pH of the solvent was adjusted for the purpose of improving stability of the aqueous dispersion of the polymer.

Once a product is gelled during polymerization, even when it is dissolved in a large amount of water, a microgel state is formed, and for this reason, it is not appropriate for coating.

<Production of Surface-Treated Substrate>
1. Preparation of Surface-Treated Glass Substrate Sample (Samples 1-3), Silicon Substrate Sample (Samples 4-6) and Titanium Substrate Sample (Sample 7)
(1) Oxygen Plasma Treatment (Surface Activation)

A glass substrate (manufactured by Matsunami Glass Ind., Ltd., product name: slide glass S1111), a silicon substrate cut into a size of 20 mm×60 mm (manufactured by Furuuchi Chemical Corporation) and a titanium substrate (manufactured by The Nilaco Corporation, product name: TI-453327) were washed with a neutral detergent, rinsed with pure water, and then further washed with acetone, followed by drying at room temperature.

The oxygen plasma treatment (Yamato Scientific Co., Ltd., PR500: 25 ml/min $O_2$, 50 W, 5 min) was carried out immediately before MPC polymer coating for surface activation.
(2) MPC Polymer Coating (Surface Treatment)

Each of the polymers of Nos. 6-8 obtained above (PMPh 6 to PMPh 8) was dissolved in water to prepare an aqueous solution of PMPh (0.1 wt %) as a surface treatment solution.

The substrate immediately after the oxygen plasma treatment was immersed in the surface treatment solution for 1 hour, then taken out therefrom and dried at 100° C. overnight. Next, the surface was scrubbed in water, then ultrasonic cleaning is performed for 5 minutes, followed by natural drying, thereby obtaining a sample having a coating layer on both the surfaces of the substrate (each 50 nm).

In the case of the glass substrate and the silicon substrate, the surface treatment solution of PMPh 6, PMPh 7 or PMPh 8 was used to produce samples. In the case of the titanium substrate, the surface treatment solution of PMPh 6 was used

TABLE 3

| | | Monomer composition | | Initiator | | | Results | |
| | | (molar ratio) | | Amount of | | | | |
| No. | Polymer sample | MPC (mol %) | Phosmer M (mol %) | initiator[*1] (parts by weight) | Type | Reaction solvent | | Water solubility[*2] |
| --- | --- | --- | --- | --- | --- | --- | --- | --- |
| 20 | PMPh 20 | 90 | 10 | 0.5 | VA-57 | Water | Gelled | Δ |
| 21 | PMPh 21 | 90 | 10 | 0.5 | VA-57 | Aqueous solution of NaOH (pH 11.81) | Gelled | Δ |
| 22 | PMPh 22 | 90 | 10 | 0.5 | VA-57 | Water (pH 9.18) Buffer | Gelled | Δ |
| 23 | PMPh 23 | 90 | 10 | 0.5 | VA-57 | Aqueous solution of sulfuric acid (pH 2.0) | Gelled | ○ |

[*1]The amount (parts by weight) of the initiator is based on the total weight (100 parts by weight) of the monomer.
[*2]Evaluation of water solubility was made according to criteria below.
○: Transparent when visually evaluated.
Δ: Cloudy when visually evaluated.

to produce a sample. In this way, the surface-treated glass substrate samples (Samples 1-3), surface-treated silicon substrate samples (Samples 4-6) and surface-treated titanium substrate sample (Sample 7) were obtained.

(3) Confirmation of MPC Polymer Coating by Means of XPS Measurement

Elemental analysis of the substrate surface of the sample to which MPC polymer coating was provided (Sample 4) was carried out using an XPS (X-ray photoelectron spectroscopy) measurement apparatus (Kuratos, Shimadzu Corporation).

In the case of the surface of the silicon substrate sample to which MPC polymer coating was provided, a peak of P at near 133 eV and a peak of quaternary ammonium N at near 403 eV were confirmed, which do not exist in the case of the untreated silicon substrate (FIGS. 1-2). Both are peaks derived from the MPC polymer and indicate the existence of the MPC polymer in the silicon substrate surface.

Also in the case of the glass substrate sample and the titanium substrate sample, like the silicon substrate sample, a peak of P at near 133 eV and a peak of quaternary ammonium N at near 403 eV were confirmed, which do not exist in the case of the untreated substrates (not shown).

2. Preparation of Surface-Treated Stainless Steel Substrate Sample (Samples 8-10)

(1) Formation of Surface Preparation Layer (Surface Vitrification)

An SUS304 substrate (manufactured by The Nilaco Corporation, product name: 753323) cut into a size of 20×60 mm was washed with a neutral detergent, rinsed with pure water, and then further washed with acetone, followed by drying at room temperature. The SUS304 substrate was coated with tetraethoxysilane (TEOS) (Wako Pure Chemical Industries, Ltd.), which is one of silane coupling agents, by the sol-gel method to form a glass thin layer on the stainless steel surface.

Specifically, a coating solution was prepared with a composition ratio (molar ratio) of TEOS:n-butanol:ethanol:pure water:phosphoric acid=1:7:7:7:0.05, and the stainless steel substrate was coated therewith by the dipping method, followed by heating at 100° C. In this way, a thin layer having a silanol group was formed on the stainless steel substrate surface.

(2) Oxygen Plasma Treatment (Surface Activation)

The oxygen plasma treatment (Yamato Scientific Co., Ltd., PR500: 25 ml/min $O_2$, 50 W, 5 min) was carried out immediately before MPC polymer coating for surface activation.

(3) MPC Polymer Coating (Surface Treatment)

The substrate immediately after the oxygen plasma treatment was treated in a manner similar to that in 1(2), thereby obtaining a sample (Samples 8-10) having a coating layer (each 50 nm) containing one of the polymers of Nos. 6-8 (PMPh 6 to PMPh 8) on both the surfaces of the substrate.

(4) Confirmation of Coating MPC Polymer by Means of XPS Measurement

Elemental analysis of the substrate surface of the sample to which MPC polymer coating was provided was carried out using an XPS (X-ray photoelectron spectroscopy) measurement apparatus (Kuratos, Shimadzu Corporation).

Regarding the surface of the stainless steel substrate sample to which MPC polymer coating was provided, a peak of P at near 133 eV and a peak of quaternary ammonium N at near 403 eV were confirmed, which do not exist in the case of the untreated stainless steel substrate (not shown). Both are peaks derived from the MPC polymer and indicate the existence of the MPC polymer in the silicon substrate surface.

3. Preparation of Surface-Treated Silicone Rubber Substrate Sample (Sample 11)

(1) Preparation of Silicone Rubber Substrate

A silicone rubber (thickness: 0.5 mm), in which an inner portion (70 mm×70 mm) was hollowed out, was used as a spacer, and it was sandwiched by PET plates (3 mm×100 mm×100 mm) to prepare a mold. Predetermined amounts of the main agent of Sylgard (registered trademark) 184 Silicone Elastomer (Dow Corning Toray Co., Ltd.) and a curing agent (10:1) were put into an eggplant flask and kneaded while performing vacuum degassing with an evaporator, the elastomer solution was flowed into the mold, and a reaction was performed at 100° C. for 1 hour. After cured, the obtained product was taken out and cut into a size of 20 mm×60 mm to provide a sample.

(2) Oxygen Plasma Treatment (Surface Activation)

The oxygen plasma treatment (Yamato Scientific Co., Ltd., PR500: 25 ml/min $O_2$, 50 W, 20 s) was carried out immediately before MPC polymer coating for surface activation.

(3) MPC Polymer Coating (Surface Treatment)

The substrate immediately after the oxygen plasma treatment was treated in a manner similar to that in 1(2), thereby obtaining a sample (Sample 11) having a coating layer containing the polymer of No. 6 (PMPh 6) on both the surfaces of the substrate.

(4) Confirmation of Coating MPC Polymer by Means of XPS Measurement

Elemental analysis of the substrate surface of the sample (Sample 11) to which MPC polymer coating was provided was carried out using an XPS (X-ray photoelectron spectroscopy) measurement apparatus (Kuratos, Shimadzu Corporation).

Regarding the surface of the silicone rubber substrate sample to which MPC polymer coating was provided, a peak of P at near 133 eV and a peak of quaternary ammonium N at near 403 eV were confirmed, which do not exist in the case of the untreated silicone rubber substrate (FIGS. 3-4). Both are peaks derived from the MPC polymer and indicate the existence of the MPC polymer in the silicon substrate surface.

4. Preparation of Surface-Treated Silicone Hydrogel Substrate Sample (Samples 12-14)

(1) Oxygen Plasma Treatment (Surface Activation)

As substrates, Medalist (Bausch & Lomb), AIR OPTIX (Alcon) and Premio (Menicon), which are commercially-available products of silicone hydrogel, were used.

Each of these materials was taken out from a case and substitution with saline was carried out, followed by natural drying. After that, using a plasma device (Yamato Scientific Co., Ltd., PR500), the oxygen plasma treatment (Yamato Scientific Co., Ltd., PR500: 30 ml/min $O_2$, 50 W, 1 min) was carried out for surface activation.

(2) MPC Polymer Coating (Surface Treatment)

The substrate immediately after the oxygen plasma treatment was treated in a manner similar to that in 1(2), thereby obtaining a sample (Samples 12-14) having a coating layer (50 nm) containing the polymer of No. 6 (PMPh 6) on both the surfaces of the substrate.

(3) Confirmation of MPC Polymer Coating by Means of XPS Measurement

Elemental analysis of the substrate surface of the sample (Sample 13) to which MPC polymer coating was provided was carried out using an XPS (X-ray photoelectron spectroscopy) measurement apparatus (Kuratos, Shimadzu Corporation).

Regarding the surface of the silicone hydrogel substrate (AIR OPTIX) sample to which MPC polymer coating was provided, a peak of P at near 133 eV and a peak of quaternary ammonium N at near 403 eV were confirmed, which do not exist in the case of the untreated silicone rubber substrate (FIGS. 5-6). Both are peaks derived from the MPC polymer and indicate the existence of the MPC polymer in the silicon substrate surface.

Also in the case of the other silicone hydrogel substrate samples, like the above-described silicone hydrogel substrate sample, a peak of P at near 133 eV and a peak of quaternary ammonium N at near 403 eV were confirmed, which do not exist in the case of the untreated substrates (not shown).

Further, the MPC polymer of No. w11 obtained above (PMPh w11; MPC:Phosmer M=90:10 (molar ratio); pH adjustment with hydrochloric acid) was dissolved in water to prepare an aqueous solution of PMPh w11 (0.5 wt %) as a surface treatment solution.

The substrate immediately after the oxygen plasma treatment was immersed in the surface treatment solution of PMPh w9 or PMPh w11 for 1 hour, then taken out therefrom and dried at 60° C. overnight. Next, the surface was scrubbed in water, followed by natural drying, thereby obtaining a sample having a coating layer (each 50 nm) on both the surfaces of the substrate. In this way, the surface-treated aluminum substrate sample (Samples 15-16), surface-treated metal copper substrate sample (Samples 17-18) and surface-treated stainless steel substrate sample (Samples 19-22) were obtained.

The surface-treated substrate samples produced above are summarized in Table 4 below.

TABLE 4

| Sample No. | Substrate | Surface treatment solution | Pretreatment |
| --- | --- | --- | --- |
| 1 | Glass substrate | PMPh 6 | Oxygen plasma treatment |
| 2 | | PMPh 7 | |
| 3 | | PMPh 8 | |
| 4 | Silicon substrate | PMPh 6 | |
| 5 | | PMPh 7 | |
| 6 | | PMPh 8 | |
| 7 | Titanium substrate | PMPh 6 | |
| 8 | SUS304 substrate | PMPh 6 | Silane coupling treatment + |
| 9 | | PMPh 7 | Oxygen plasma treatment |
| 10 | | PMPh 8 | |
| 11 | Silicone rubber substrate | PMPh 6 | Oxygen plasma treatment |
| 12 | Silicone hydrogel (Medalist) | PMPh 6 | |
| 13 | Silicone hydrogel (AIR OPTIX) | PMPh 6 | |
| 14 | Silicone hydrogel (Premio) | PMPh 6 | |
| 15 | Aluminum substrate | PMPh w9 | |
| 16 | (Al1050) | PMPh w11 | |
| 17 | Metal copper substrate | PMPh w9 | |
| 18 | (C1100) | PMPh w11 | |
| 19 | SUS304 substrate | PMPh w9 | |
| 20 | | PMPh w11 | |
| 21 | SUS316L substrate | PMPh w9 | |
| 22 | | PMPh w11 | |

5. Preparation of Surface-Treated Aluminum Substrate Sample (Samples 15-16), Metal Copper Substrate Sample (Samples 17-18) and Stainless Steel Substrate Sample (Samples 19-22)
(1) Oxygen Plasma Treatment (Surface Activation)

An aluminum substrate (Al1050), a metal copper substrate (C1100), an SUS304 substrate and an SUS316L substrate, which were cut into a size of 25×25 mm, were washed with a neutral detergent, rinsed with pure water, and then further washed with acetone, followed by drying at room temperature.

The oxygen plasma treatment (Yamato Scientific Co., Ltd., PR200: 30 ml/min $O_2$, 50 W, 2 min) was carried out immediately before MPC polymer coating for surface activation.
(2) MPC Polymer Coating (Surface Treatment)

The MPC polymer of No. w9 obtained above (PMPh w9; MPC:Phosmer M=70:30 (molar ratio); pH adjustment with phosphoric acid) was dissolved in water to prepare an aqueous solution of PMPh w9 (0.5 wt %) as a surface treatment solution.

(Evaluation: Measurement of Contact Angle)
(1) Method

The water contact angle was measured by the captive bubble method using a measurement apparatus of the inventors' own making.

Measurement apparatus: A measurement apparatus shown in FIG. 7 was assembled. Each surface-treated substrate sample subjected to MPC polymer coating was fixed to a fixture, and the fixture was sucked by a pump to be kept in water. An air bubble was pushed out from a microsyringe and adsorbed to the sample surface. The adsorbed air bubble was photographed by a CMOS camera, and the water contact angle was obtained by image processing. In FIG. 8, when the contact angle θ is larger, it means that hydrophilicity of the substrate surface is higher.

(2) Results
(i) Surface-Treated Glass Substrate

In the case of the untreated glass substrate, the value was 170° (not shown), while in the ease of the sample subjected to the MPC polymer treatment (Samples 1-3), similarly, the values were about 170°, and there was no significant change (FIG. 9).

(ii) Surface-Treated Silicon Substrate

In the case of the untreated silicon substrate, the value was 158°, while in the case of the sample subjected to the MPC polymer treatment (Samples 4-6), the values were improved to 167° or more (FIG. 10).

(ii) Surface-Treated Titanium Substrate.

In the case of the untreated titanium substrate, the value was 132°, while in the case of the sample subjected to the MPC polymer treatment (Sample 7), the value was improved to 168° or more (FIG. 11).

(iii) Surface-Treated Stainless Steel Substrate (a) Surface-Treated SUS304 Substrate (Treated with Silane Coupling Agent)

In the case of the untreated SUS304 substrate, the value was 138°, while in the case of the sample subjected to the MPC polymer treatment (Samples 8-10), the values were improved to 169° or more (FIG. 12A).

(b) Surface-Treated SUS304 Substrate (not Treated with Silane Coupling Agent)

In the case of the untreated SUS304 substrate, the value was 136°, while in the case of the sample subjected to the MPC polymer treatment (Samples 19-20), the values were improved to 169° (FIG. 12B).

(c) Surface-Treated SUS316L Substrate (not Treated with Silane Coupling Agent)

In the case of the untreated. SUS316L substrate, the value was 142°, while in the case of the sample subjected to the MPC polymer treatment (Samples 21-22), the values were improved to 168° (FIG. 12C).

(iv) Surface-Treated Silicone Hydrogel Substrate

In the case of the samples of Medalist (Bausch & Lomb), AIR OPTIX (Alcon) and Premio (Menicon) subjected to the MPC polymer treatment (Samples 12-14), the values were significantly improved by 5° or more when compared to the untreated silicone hydrogel substrates (contact lenses), and it indicates that hydrophilicity of the surface was improved (FIG. 13).

(v) Surface-Treated Aluminum Substrate

In the case of the untreated aluminum substrate, the value was 139°, while in the case of the sample subjected to the MPC polymer treatment (Samples 15-16), the values were improved to 168° (FIG. 14).

(vi) Surface-Treated Metal Copper Substrate

In the case, of the untreated metal copper substrate, the value was 131°, while in the case of the sample subjected to the MPC polymer treatment (Samples 17-18), the values were improved to 167° or more (FIG. 15).

(Evaluation: Confirmation of Antifouling Property (Self-Cleaning Effects))

(1) Method

To each untreated substrate and each sample subjected to MPC polymer coating, a drop of oil-based ink (vermilion inkpad) was applied, followed by drying. After that, each substrate was immersed in water, and 2 minutes later, it was taken out from water, and in this way, the substrate was, rinsed with water.

(2) Results

Photographs of untreated substrates and samples coated with the MPC polymer (PMPh 6 was used) after ink application and after rinsing with water are shown in FIGS. 16-19. FIG. 16 shows photographs of glass substrates, FIG. 17 shows photographs of silicon substrates, FIG. 18 shows photographs of titanium substrates, and FIG. 19 shows photographs of stainless steel substrates.

According to FIGS. 16-19, in the case of the untreated samples, the dirt of ink was still adsorbed to the substrate surface even after rinsing with water, but in the case of the samples coated with the MPC polymer, the dirt of ink was spontaneously washed away within a few minutes, and adsorption of the ink to the substrate surface was not observed at all.

The invention claimed is:

1. The surface-treated substrate, comprising:
a substrate; and
a hydrophilic coating layer on at least one of the surfaces of the substrate, wherein the hydrophilic coating layer contains a polymer compound represented by formula (1):

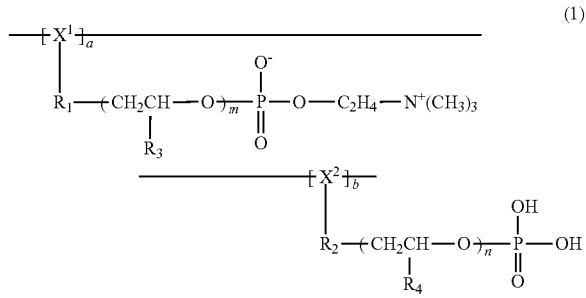

wherein:
$X^1$ and $X^2$ each independently represent a polymerizable atomic group in a polymerized state:
$R^1$ and $R^2$ each independently represent a substituted or unsubstituted phenyl group or a group represented by —C(O)—, —C(O)O— or —O—;
$R^3$ represents a hydrogen atom or a group represented by a $C_{1-3}$ alkyl group;
m and n each independently represent an integer of 1 or more;
a and b each independently represent an integer of 2 or more; and
a structural unit including $X^1$ and a structural unit including $X^2$ are bound in random order,
wherein the substrate is selected from the group consisting of a glass substrate, a silicon substrate, a metal substrate, a metal oxide substrate, a silicone rubber substrate, a silicone hydrogel substrate and a ceramic substrate,
wherein the hydrophilic coating layer is chemically immobilized on the surface of the substrate through chemical bonding by dehydration condensation between a phosphonic acid group contained in the polymer of formula (1) and a functional group existing on the substrate surface that can interact with the phosphonic acid group.

2. The surface-treated substrate according to claim 1, wherein the compound represented by formula (1) is a polymer having a structure represented by formula (2):

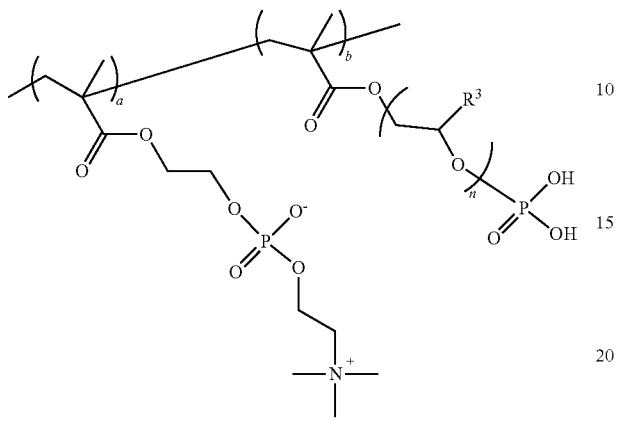

(2)

wherein:
$R^3$ represents a hydrogen atom or a $C_{1-3}$ alkyl group;
a and b each independently represent an integer of 2 or more;
n represents an integer of 1 or more; and
respective monomer units are bound in random order.

3. The surface-treated substrate according to claim 1, wherein a/(a+b) is 0.30 to 0.99.

4. The surface-treated substrate according to claim 1, with which a surface of a substrate can be hydrophilized.

5. The surface-treated substrate according to claim 1, wherein the functional group existing on the substrate surface is selected from silanol (Si—OH), titanol (Ti—OH), Zr—OH and other reactive groups.

6. A surface treatment method for preparing a surface-treated substrate, which comprises applying a treatment agent comprising a polymer compound of formula (I) to a surface of the substrate;

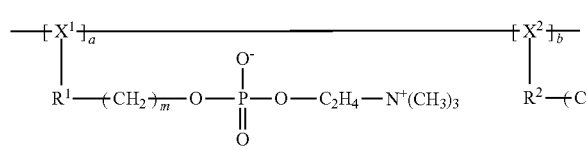

(1)

wherein:
$X^1$ and $X^2$ each independently represent a polymerizable atomic group in a polymerized state;
$R^1$ and $R^2$ each independently represent a substituted or unsubstituted phenyl group or a group represented by —C(O)—, —C(O)O— or —O—;
$R^3$ represents a hydrogen atom or a group represented by a $C_{1-3}$ alkyl group;
m and n each independently represent an integer of 1 or more;
a and b each independently represent an integer of 2 or more; and
a structural unit including $X^1$ and a structural unit including $X^2$ are bound in random order; and
optionally, wherein the compound of formula (I) is in the form of an aqueous solution
wherein the hydrophilic coating layer is chemically immobilized on the surface of substrate through chemical bonding by dehydration condensation between a phosphonic acid group contained in the polymer of formula (1) and a functional group existing on the substrate surface that can interact with the phosphonic acid group.

7. A method for producing a surface-treated substrate having a substrate and a hydrophilic coating layer chemically immobilized on at least one of the surfaces of the substrate, the method comprising:
treating the substrate with at least one selected from the group consisting of plasma treatment, UV/ozone cleaning, corona discharge treatment, flame treatment, ozone water treatment, and hydrogen peroxide solution/Fenton reaction solution treatment; and
applying a treatment agent comprising a polymer compound of formula (I) onto the substrate, followed by drying;

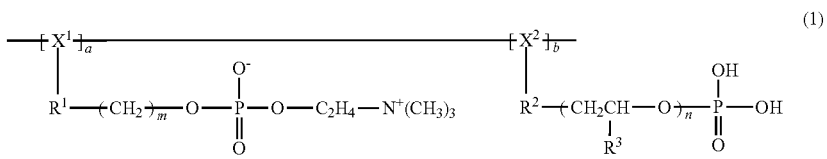

(1)

wherein:
$X^1$ and $X^2$ each independently represent a polymerizable atomic group in a polymerized state;
$R^1$ and $R^2$ each independently represent a substituted or unsubstituted phenyl group or a group represented by —C(O)—, —C(O)O— or —O—;
$R^3$ represents a hydrogen atom or a group represented by a $C_{1-3}$ alkyl group;
m and n each independently represent an integer of 1 or more;
a and b each independently represent an integer of 2 or more; and
a structural unit including $X^1$ and a structural unit including $X^2$ are bound in random order; and optionally, wherein the compound of formula (I) is in the form of an aqueous solution, wherein the substrate is selected from the group consisting of a glass substrate, a silicon substrate, a metal substrate, a metal oxide substrate, a silicone rubber substrate, a silicone hydrogel substrate and a ceramic substrate wherein the hydrophilic coating layer is chemically immobilized on the surface of substrate through chemical bonding by dehydration condensation between a phosphonic acid group contained in the polymer of formula (1) and a functional group existing on the substrate surface that can interact with the phosphonic acid group.

8. The method according to claim 7, which further comprises treating the substrate with a silane coupling agent or a titanate coupling agent.

* * * * *